(12) United States Patent
Yap et al.

(10) Patent No.: US 10,152,326 B2
(45) Date of Patent: Dec. 11, 2018

(54) METHOD AND APPARATUS TO PROCESS SHA-2 SECURE HASHING ALGORITHM

(71) Applicant: Intel Corporation, Santa Clara, CA (US)

(72) Inventors: Kirk S. Yap, Framingham, MA (US); Gilbert M. Wolrich, Framingham, MA (US); James D. Guilford, Northborough, MA (US); Vinodh Gopal, Westborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,568

(22) Filed: Dec. 31, 2016

(65) Prior Publication Data
US 2017/0147340 A1 May 25, 2017

Related U.S. Application Data

(63) Continuation of application No. 13/976,274, filed as application No. PCT/US2012/031632 on Mar. 30, 2012, now Pat. No. 9,632,782.

(51) Int. Cl.
*H04L 9/06* (2006.01)
*G06F 9/30* (2018.01)
(Continued)

(52) U.S. Cl.
CPC ........ *G06F 9/3016* (2013.01); *G06F 9/30007* (2013.01); *G06F 9/30036* (2013.01);
(Continued)

(58) Field of Classification Search
CPC .................................................. G06F 21/602
(Continued)

(56) References Cited

U.S. PATENT DOCUMENTS

| 5,357,617 | A | 10/1994 | Davis et al. |
| 6,829,355 | B2 * | 12/2004 | Lilly .......... H04L 9/0643 380/255 |

(Continued)

FOREIGN PATENT DOCUMENTS

| CN | 103348333 A | 10/2013 |
| CN | 103460182 A | 12/2013 |
| EP | 1596281 A2 | 11/2005 |

OTHER PUBLICATIONS

Hennessy, John & Patterson, David. "Computer Architecture: A Quantitative Approach." 4th Edition Published 2007. 4 pages.*

(Continued)

*Primary Examiner* — Andrew Caldwell
*Assistant Examiner* — Michael J Metzger
(74) *Attorney, Agent, or Firm* — Nicholson de Vos Webster & Elliott LLP

(57) ABSTRACT

A processor includes an instruction decoder to receive a first instruction to process a secure hash algorithm 2 (SHA-2) hash algorithm, the first instruction having a first operand associated with a first storage location to store a SHA-2 state and a second operand associated with a second storage location to store a plurality of messages and round constants. The processor further includes an execution unit coupled to the instruction decoder to perform one or more iterations of the SHA-2 hash algorithm on the SHA-2 state specified by the first operand and the plurality of messages and round constants specified by the second operand, in response to the first instruction.

34 Claims, 24 Drawing Sheets

(51) Int. Cl.
  *G06F 21/60* (2013.01)
  *H04L 9/32* (2006.01)
  *G06F 9/38* (2018.01)
  *G06F 12/0875* (2016.01)
  *G06F 12/0897* (2016.01)
  *G06F 12/1027* (2016.01)
  *G06F 15/80* (2006.01)

(52) U.S. Cl.
  CPC ...... *G06F 9/30058* (2013.01); *G06F 9/30098* (2013.01); *G06F 9/30145* (2013.01); *G06F 9/3802* (2013.01); *G06F 9/384* (2013.01); *G06F 12/0875* (2013.01); *G06F 12/0897* (2013.01); *G06F 12/1027* (2013.01); *G06F 15/8007* (2013.01); *G06F 21/602* (2013.01); *H04L 9/0643* (2013.01); *H04L 9/3239* (2013.01); *G06F 2212/452* (2013.01); *G06F 2212/68* (2013.01); *H04L 2209/125* (2013.01)

(58) Field of Classification Search
  USPC .......................................................... 713/189
  See application file for complete search history.

(56) References Cited

U.S. PATENT DOCUMENTS

| | | | | |
|---|---|---|---|---|
| 2005/0089160 | A1* | 4/2005 | Crispin | G06F 9/30018 380/28 |
| 2010/0106976 | A1 | 4/2010 | Aciicmez et al. | |
| 2010/0250966 | A1* | 9/2010 | Olson | G06F 9/30018 713/190 |
| 2010/0278331 | A1* | 11/2010 | Walker | G06F 21/72 380/28 |
| 2011/0320825 | A1 | 12/2011 | Greiner et al. | |

OTHER PUBLICATIONS

Communication pursuant to Article 94(3) EPC for Application No. 12873156.9, dated Oct. 31, 2017, 6 pages.
Extended European Search Report for Application No. 12873156.9, dated Oct. 28, 2015, 8 pages.
First Office Action and Search Report from foreign counterpart Chinese Patent Application No. 201280072066.0, dated Oct. 11, 2016, 16 pages.
International Preliminary Report on Patentability for Application No. PCT/US2012/031632, dated Oct. 9, 2014, 5 pages.
International Search Report and Written Opinion for Application No. PCT/US2012/031632, dated Oct. 29, 2012, 10 pages.
Non-Final Office Action from U.S. Appl. No. 13/976,274, dated Apr. 4, 2016, 11 pages.
Non-Final Office Action from U.S. Appl. No. 15/396,563, dated Feb. 7, 2018, 18 pages.
Non-Final Office Action from U.S. Appl. No. 15/396,572, dated Feb. 7, 2018, 18 pages.
Non-Final Office Action from U.S. Appl. No. 15/396,574, dated Oct. 3, 2017, 7 pages.
Non-Final Office Action from U.S. Appl. No. 15/396,576, dated Jan. 12, 2018, 12 pages.
Non-Final Office Action from U.S. Appl. No. 15/396,578, dated Jan. 12, 2018, 12 pages.
Notice of Allowance from U.S. Appl. No. 13/976,274, dated Dec. 27, 2016, 7 pages.
Notice of Allowance from U.S. Appl. No. 13/976,274, dated Jul. 29, 2016, 5 pages.
Notice of Allowance from U.S. Appl. No. 15/396,574, dated Jun. 29, 2018, 7 pages.
Notice of Allowance from U.S. Appl. No. 15/396,574, dated Mar. 22, 2018, 13 pages.
Notice of Allowance from U.S. Appl. No. 15/396,576, dated Jul. 11, 2018, 8 pages.
Notice of Allowance from U.S. Appl. No. 15/396,578, dated Jul. 5, 2018, 9 pages.
Notice on Grant of Patent Right for Invention from foreign counterpart Chinese Patent Application No. 201280072066.0, dated Jan. 11, 2018, 4 pages.
Second Office Action from foreign counterpart Chinese Patent Application No. 201280072066.0, dated Jul. 31, 2017, 15 pages.
US Department of Commerce, Information Technology Laboratory, "Secure Hash Standard," (FIPS Pub 180-3) Federal Information Processing Standards Publication, Washington D.C., Oct. 2008, 32 pages.
First Office Action and Search Report from foreign counterpart Chinese Patent Application No. 201710074199.6 dated Aug. 6, 2018, 16 pages.

* cited by examiner

```
MOV            XMM0, (3, 2, 1, 0)
    VADD   XMM11, XMM0, MEMK3-0
    SHA256RNDS2 YMM15, XMM11   (1,0)
    VPERM   XMM12, XMM11
    SHA256RNDS2 YMM15, XMM12   (3,2)
MOV            XMM1, (7, 6, 5, 4)
MSG1SHA256     XMM0, XMM1, XMM0
VADD   XMM13, XMM1, MEMK7-4
    SHA256RNDS2 YMM15, XMM13   (5,4)    801
    VPERM   XMM14, XMM13
    SHA256RNDS2 YMM15, XMM14   (7,6)    802
MOV            XMM2, (11, 10, 9, 8)
MSG1SHA256     XMM1, XMM2, XMM1
VADD   XMM11, XMM2, MEMK11-8
    SHA256RNDS2 YMM15, XMM11          (9,8)
VPERM   XMM12, XMM11
    SHA256RNDS2 YMM15, XMM12   (11,10)
MOV            XMM3, (15, 14, 13, 12)
MSG1SHA256     XMM2, XMM3, XMM2
VADD   XMM13, XMM1, MEMK15-12
    SHA256RNDS2 YMM15, XMM13   (13,12)
    VPERM   XMM14, XMM13
    SHA256RNDS2 YMM15, XMM14   (15,14)
MSG2SHA256     XMM0, XMM3, XMM2   (19, 18, 17, 16)
MSG1SHA256     XMM3, XMM0, XMM3
VADD   XMM11, XMM2, MEMK19-16
    SHA256RNDS2 YMM15, XMM11          (17,16)
VPERM   XMM12, XMM11
    SHA256RNDS2 YMM15, XMM12   (19,18)
```

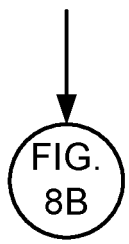

FIG. 8A

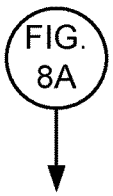

```
MSG2SHA256    XMM1, XMM0, XMM3   (23, 22, 21,
20)
MSG1SHA256         XMM0, XMM1, XMM0
VADD   XMM13, XMM2, MEMK23-20
      SHA256RNDS2 YMM15, XMM13         (21,20)
VPERM  XMM14, XMM13
      SHA256RNDS2 YMM15, XMM12   (23,22)
MSG2SHA256    XMM2, XMM1, XMM0   (27, 26, 25,
24)
MSG1SHA256         XMM1, XMM2, XMM1
VADD   XMM11, XMM2, MEMK27-24
      SHA256RNDS2 YMM15, XMM11         (25,24)
VPERM  XMM12, XMM11
      SHA256RNDS2 YMM15, XMM12   (27,26)
MSG2SHA256    XMM3, XMM2, XMM1   (31, 30, 29,
28)
MSG1SHA256         XMM2, XMM3, XMM2
VADD   XMM13, XMM2, MEMK19-16
      SHA256RNDS2 YMM15, XMM13         (29,28)
VPERM  XMM14, XMM13
      SHA256RNDS2 YMM15, XMM12   (31,30)
MSG2SHA256    XMM0, XMM3, XMM2   (35, 34, 33,
32)
MSG1SHA256         XMM3, XMM0, XMM3
VADD   XMM11, XMM2, MEMK35-32
      SHA256RNDS2 YMM15, XMM11         (33,32)
VPERM  XMM12, XMM11
      SHA256RNDS2 YMM15, XMM12   (35,34)
MSG2SHA256    XMM1, XMM0, XMM3   (39, 38, 37,
36)
MSG1SHA256         XMM0, XMM1, XMM0
VADD   XMM13, XMM2, MEMK39-36
      SHA256RNDS2 YMM15, XMM13         (37,36)
VPERM  XMM14, XMM13
      SHA256RNDS2 YMM15, XMM12   (39,38)
```

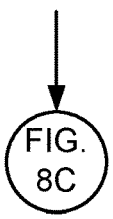

FIG. 8B

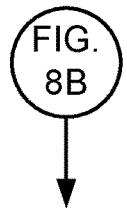

```
MSG2SHA256      XMM2, XMM1, XMM0     (43, 42, 41, 40)
MSG1SHA256           XMM1, XMM2, XMM1
VADD    XMM11, XMM2, MEMK43-40
        SHA256RNDS2 YMM15, XMM11            (41,40)
VPERM   XMM12, XMM11
        SHA256RNDS2 YMM15, XMM12            (43,42)
MSG2SHA256      XMM3, XMM2, XMM1     (47, 46, 45, 44)
MSG1SHA256           XMM2, XMM3, XMM2
VADD    XMM13, XMM2, MEMK47-44
        SHA256RNDS2 YMM15, XMM13            (45,44)
VPERM   XMM14, XMM13
        SHA256RNDS2 YMM15, XMM12            (47,46)
MSG2SHA256      XMM0, XMM3, XMM2     (51, 50, 49, 48)
MSG1SHA256           XMM3, XMM0, XMM3
VADD    XMM11, XMM2, MEMK51-48
        SHA256RNDS2 YMM15, XMM11            (49,48)
VPERM   XMM12, XMM11
        SHA256RNDS2 YMM15, XMM12            (51,50)
MSG2SHA256      XMM1, XMM0, XMM3     (55, 54, 53, 52)
VADD    XMM13, XMM2, MEMK55-52
        SHA256RNDS2 YMM15, XMM13            (53,52)
VPERM   XMM14, XMM13
        SHA256RNDS2 YMM15, XMM12            (55,54)
MSG2SHA256      XMM2, XMM1, XMM0     (59, 58, 57, 56)
VADD    XMM11, XMM2, MEMK59-56
        SHA256RNDS2 YMM15, XMM11            (57,56)
VPERM   XMM12, XMM11
        SHA256RNDS2 YMM15, XMM12            (59,58)
MSG2SHA256      XMM3, XMM2, XMM1     (63, 62, 61, 60)
VADD    XMM13, XMM2, MEMK63-60
        SHA256RNDS2 YMM15, XMM13            (61,60)
VPERM   XMM14, XMM13
        SHA256RNDS2 YMM15, XMM12            (63,62)
```

FIG. 8C

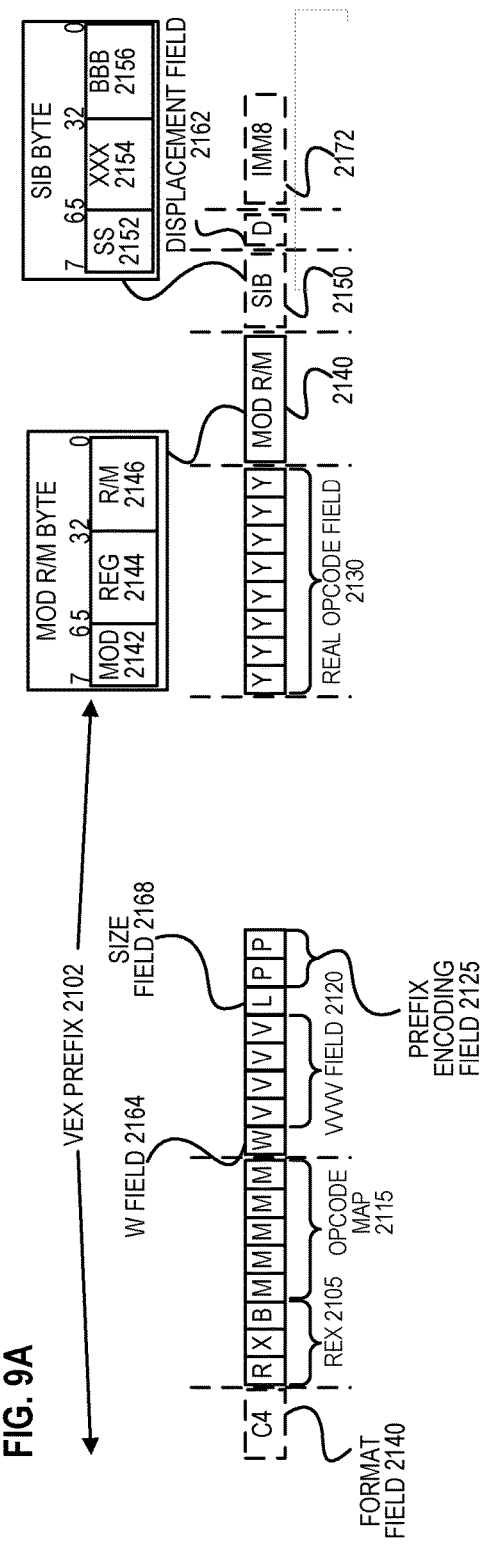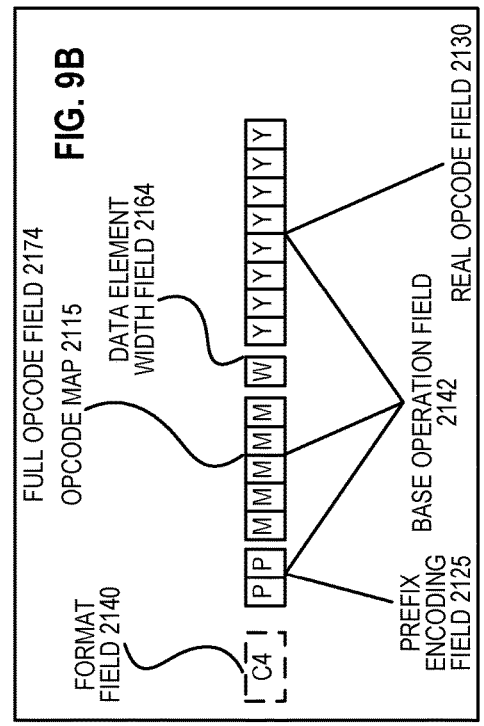

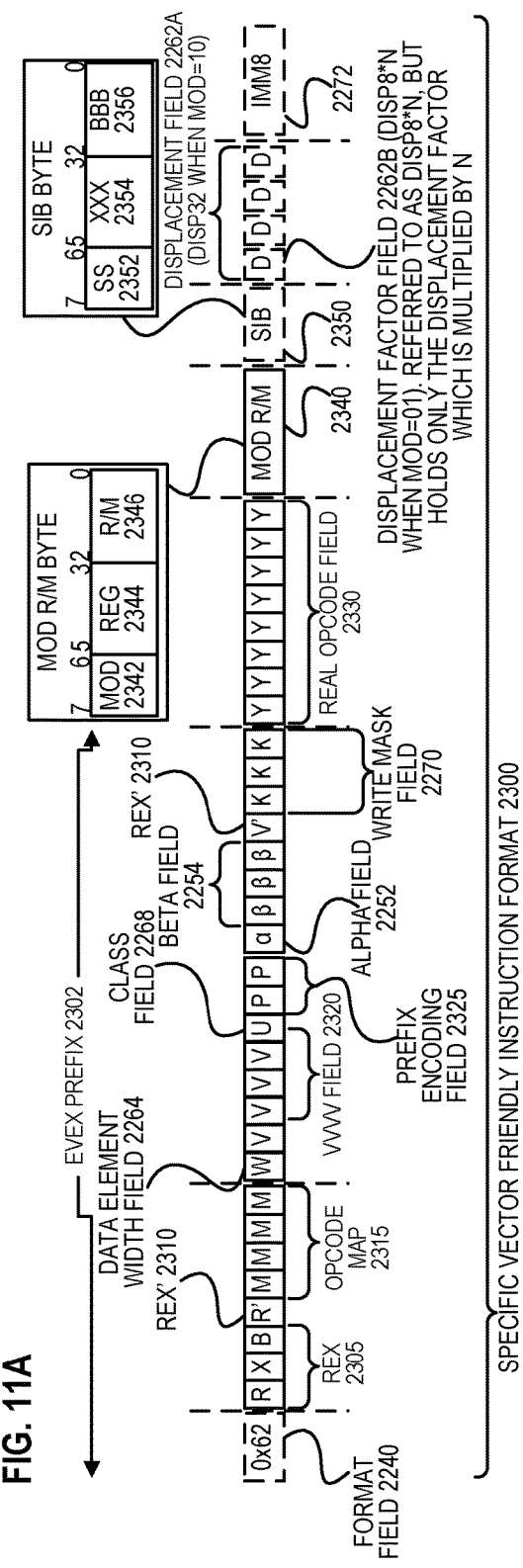
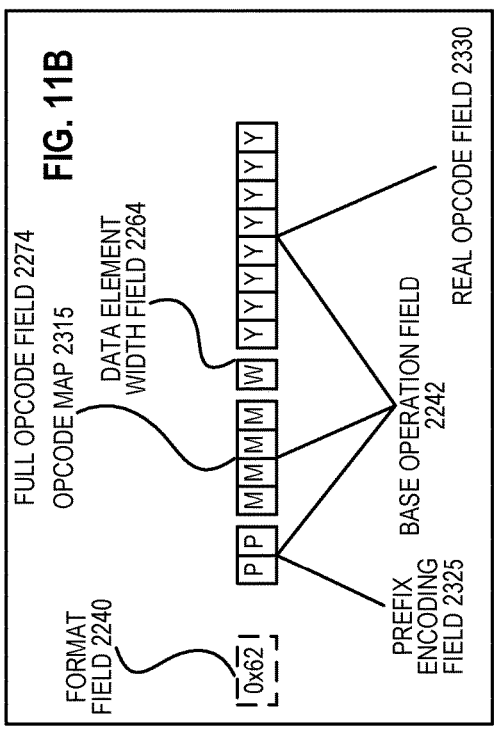
FIG. 11A
FIG. 11B
FIG. 11C

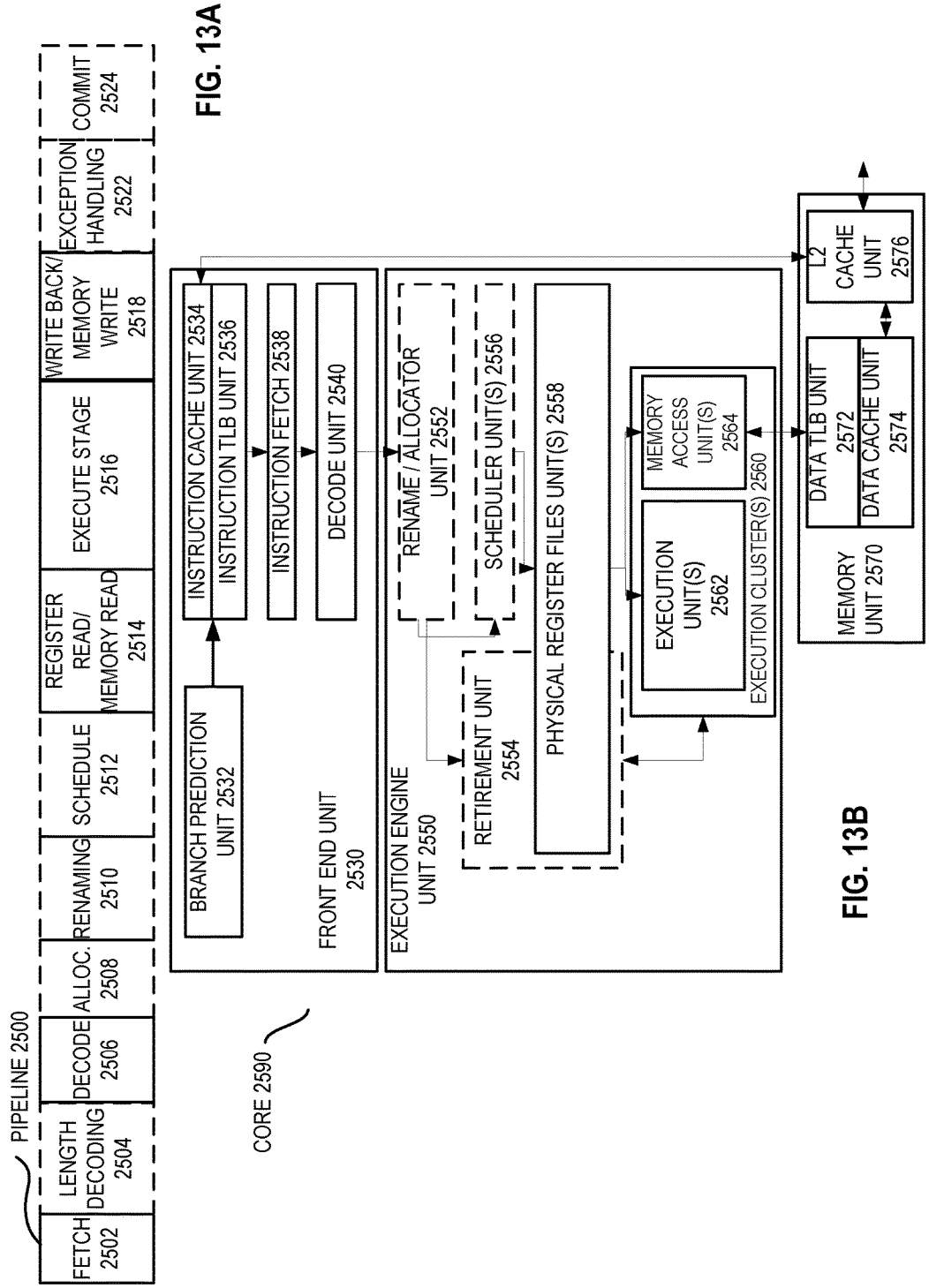

METHOD AND APPARATUS TO PROCESS SHA-2 SECURE HASHING ALGORITHM

TECHNICAL FIELD

Embodiments of the present invention relate generally to instruction processing apparatuses. More particularly, embodiments of the invention relate to instruction processing apparatus to process SHA-2 secure hashing algorithms.

BACKGROUND ART

SHA stands for Secure Hash Algorithm. It consists of five hash functions designed by the National Security Agency (NSA) and published by the National Institute of Standards and Technology (NIST). One of them is SHA-2. SHA-2 is a set of secure hash functions including SHA 224, SHA 256, SHA 384, and SHA 512 developed by the NSA intended to provide a higher level of security than the SHA-1 algorithm. SHA 224 and SHA 256 are similar algorithms based on a 32 bit word length producing digests of 224 and 256 bits. SHA 384 and SHA 512 are based on 64 bit words and produce digests of 384 and 512 bits.

The SHA-2 algorithm is computationally more complex the SHA 1, relying on carry propagate additions as well as logical operations and rotates. A critical path for a round of SHA-2 operations consists of four consecutive propagate additions with adder inputs being determined by complex logical and rotation functions. FIG. 1 depicts details of the SHA-2 algorithm. A, B, C, D, E, F, G, and H represent the 8 words of state (32 bits for SHA 224/256 and 64 bits for SHA 384/512). Following operations are performed for each iteration:

$$Ch(E, F, G)=(E \wedge F) \oplus (\neg E \wedge G)$$

$$Ma(A, B, C)=(A \wedge B) \oplus (A \wedge C) \oplus (B \wedge)$$

$$\Sigma_0(A)=(A \ggg 2) \oplus (A \ggg 13) \oplus (A \ggg 22)$$

$$\Sigma_1(E)=(E \ggg 6) \oplus (E \ggg 11) \oplus (E \ggg 25)$$

The bitwise rotation uses different constants for SHA-512. In this example, the given numbers are for SHA-256. Constant K plus Wi message input addition can be performed ahead of the round critical path. The message scheduling function for the SHA-2 algorithm is also more complex than SHA-1 relying on rotated copies of previous message inputs to form message inputs:

for i from 16 to 63

$$s0:=(w[i-15] \text{ROTR } 7) \text{XOR}(w[i-15] \text{ROTR } 18) \text{XOR} (w[i-15] \text{SHR } 3)$$

$$s1:=(w[i-2] \text{ROTR } 17) \text{XOR}(w[i-2] \text{ROTR } 19) \text{XOR}(w[i-2] \text{SHR } 10)$$

$$w[i]:=w[i-16]+s0+w[i-7]+s1$$

where ROTR (also used as ">>>") denotes a bitwise right-rotate operator; SHR denotes a bitwise right-shift operator; and XOR denotes a bitwise exclusive-OR operator.

For SHA-256, each iteration is performed as follows:

$$\Sigma_0:=(a \text{ ROTR } 2) \text{XOR}(a \text{ ROTR } 13) \text{XOR}(a \text{ ROTR } 22)$$

$$maj:=(a \text{ AND } b) \text{XOR}(a \text{ AND } c) \text{XOR}(b \text{ AND } c)$$

$$t2:=\Sigma_0+maj$$

$$\Sigma_1:=(e \text{ ROTR } 6) \text{XOR}(e \text{ ROTR } 11) \text{XOR}(e \text{ ROTR } 25)$$

$$ch:=(e \text{ AND } f) \text{XOR}((\text{NOT } e) \text{AND } g)$$

$$t1:=h+\Sigma_1+ch+k[i]+w[i]$$

h:=g
g:=f
f:=e
e:=d+t1
d:=c
c:=b
b:=a
a:=t1+t2

Message input w[i] for rounds 1 to 16 is the 32 bit× 16=512 bit block of data. W[i] for rounds 17 to 64 must be derived. Constant K is specified for each round, the W[i]+K[i] value for each round can calculated ahead of the actual round iteration. Further detailed information concerning the SHA-2 specification can be found in Secure Hash Standard published by Federal Information Processing Standard Publication (FIPS PUB 180-3, published October, 2008).

Conventional software solutions using standard instructions require a separate instruction for each of the addition and logical shift/rotate instructions needed to implement the round and scheduling functions of the SHA-2 such as the SHA256 algorithm. Current industry benchmark data for SHA256 is in the 15 cycles per byte range. The limit for a standard instruction implementation of SHA256 potentially approaches the 9 cycle per byte range. There has been a lack of efficient ways to perform the above operations.

BRIEF DESCRIPTION OF THE DRAWINGS

Embodiments of the invention are illustrated by way of example and not limitation in the figures of the accompanying drawings in which like references indicate similar elements.

FIGS. 8A-8C are pseudocode illustrating a process of SHA-256 round operations according to one embodiment.

FIG. 9A illustrates an exemplary advanced vector extensions (AVX) instruction format according to one embodiment of the invention.

FIG. 9B illustrates an exemplary advanced vector extensions (AVX) instruction format according to another embodiment of the invention.

FIG. 9C illustrates an exemplary advanced vector extensions (AVX) instruction format according to another embodiment of the invention.

FIG. 11A is a block diagram illustrating an exemplary specific vector friendly instruction format according to one embodiment of the invention.

FIG. 11B is a block diagram illustrating a generic vector friendly instruction format according to another embodiment of the invention.

FIG. 11C is a block diagram illustrating a generic vector friendly instruction format according to another embodiment of the invention.

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention.

DESCRIPTION OF THE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a new instruction set architecture (ISA) is utilized to perform one or more rounds of SHA-2 operations described above in response to a single instruction (e.g., a single instruction multiple data or SIMD instruction) to improve the efficiency of the SHA-2 computation. A conventional system has to utilize multiple instructions to perform a round of SHA-2 round operations. The performance may be optimized by reducing the time required to perform the SHA-2 round function while deriving the message inputs for subsequent rounds in a pipeline manner, such that the speed of executing the SHA-2 algorithm is mainly subject to the round calculation. In one embodiment, to perform 256-bit (e.g., SHA-256) round operations, registers having at least 256 bits are utilized to store SHA-2 state variables (e.g., state variables A, B, C, D, E, F, G, and H) and multiple message inputs (e.g., at least four message inputs), such that one or more rounds of SHA-2 round hash operations can be performed in parallel by a processor such as a vector capable processor in response to a single instruction. In addition, registers having at least 128 bits are utilized to prepare multiple message inputs for the next cycle or iteration (e.g., next one or more rounds) based on previous message inputs.

Figure 2:
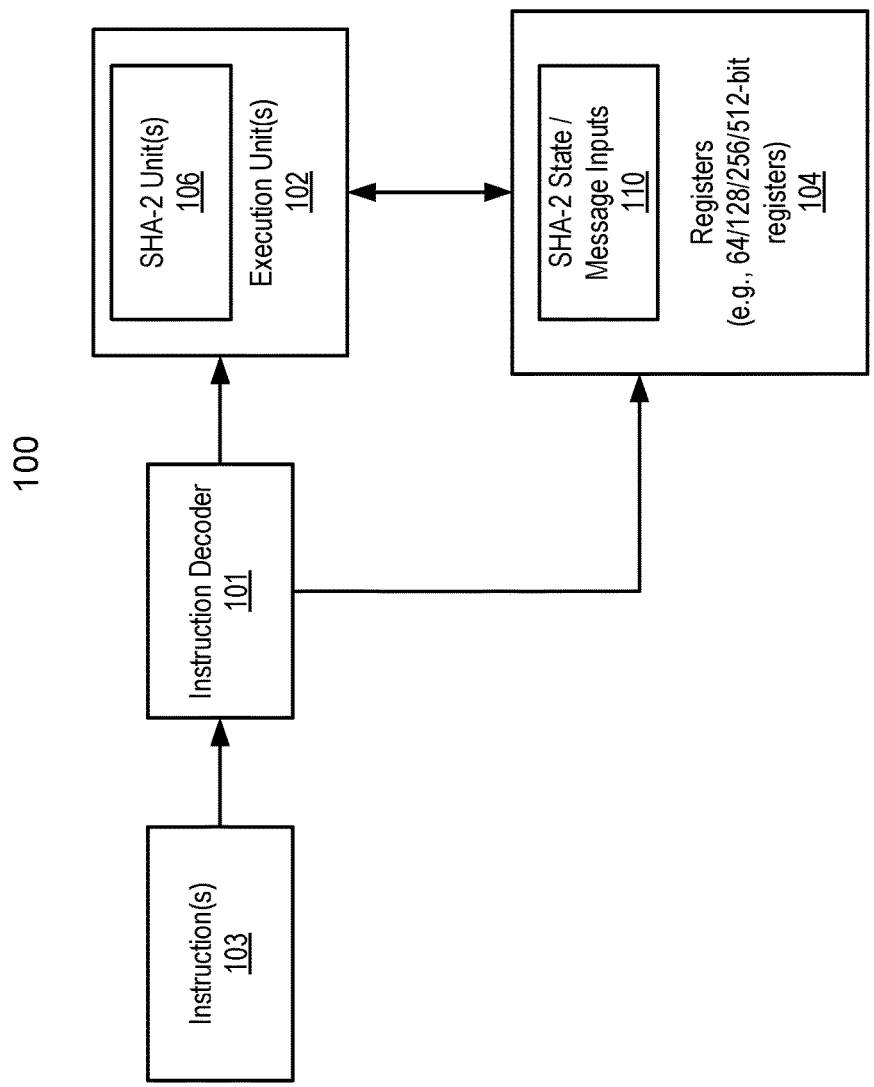
FIG. 2 is a block diagram of an execution pipeline of a processor or processor core according to one embodiment of the invention.

FIG. 2 is a block diagram of an execution pipeline of a processor or processor core according to one embodiment of the invention. Referring to FIG. 2, processor 100 may represent any kind of instruction processing apparatuses. For example, processor 100 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. Processor 100 may also represent one or more processor cores.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In one embodiment, processor 100 includes, but is not limited to, instruction decoder 101 and one or more execution units 102. Instruction decoder 101 is to receive and decode instructions 103 from an instruction fetch unit (not shown). Instruction decoder 102 may generate and output one or more micro-operations, micro-code, entry points, microinstructions, other instructions, or other control signals, which reflect, or are derived from, the instructions. Instruction decoder 102 may be implemented using various different mechanisms. Examples of suitable mechanisms include, but are not limited to, microcode read only memories (ROMs), look-up tables, hardware implementations, programmable logic arrays (PLAs), and the like.

Execution units 102, which may include an arithmetic logic unit, or another type of logic unit capable of performing operations based on instructions. As a result of instruction decoder 102 decoding the instructions, execution unit 102 may receive one or more micro-operations, micro-code entry points, microinstructions, other instructions, or other control signals, which reflect, or are derived from, the instructions. Execution unit 102 may be operable as a result of instructions indicating one or more source operands (SRC) and to store a result in one or more destination operands (DEST) of a register set indicated by the instructions. Execution unit 102 may include circuitry or other execution logic (e.g., software combined with hardware and/or firmware) operable to execute instructions or other control signals derived from the instructions and perform an operation accordingly. Execution unit 102 may represent any kinds of execution units such as logic units, arithmetic logic units (ALUs), arithmetic units, integer units, etc.

Some or all of the source and destination operands may be stored in registers of a register set or memory. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Referring back to FIG. 2, according to one embodiment, execution unit 102 includes one or more SHA-2 units 106 to, in response to a first instruction received and provided by instruction decoder 101, to perform one or more rounds of SHA-2 round operations using data 110 such as SHA-2 states A to H, message inputs (w), and corresponding constants $W_t$ and $K_t$ stored in one or more registers 104. The one or more rounds of SHA-2 round operations are performed in response to a single instruction as a single instruction multiple data (SIMD) instruction. The number of rounds of SHA-2 round operations depends on the specific design or configuration (e.g., pipeline latency requirement) of the processor pipeline, which may be configured to an appropriate number that will optimize the overall performance of the processor pipeline. For the purpose of illustration, it is assumed two rounds of SHA-2 round operations are performed in a single SIMD cycle. It will be appreciated, more or fewer rounds of SHA-2 round operations can also be performed in a single SIMD cycle, as long as the required resources such as registers or memory with proper sizes are available.

According to one embodiment, one or more rounds of SHA-2 round operations are performed in response to a single instruction as a single instruction multiple data (SIMD) instruction. In one embodiment, the first instruction includes two operands. The first operand represents a source/destination register to store a current SHA-2 state as an input and a next SHA-2 state as a result of the one or more SHA-2 round operations. The second operand represents a register/memory to store multiple message inputs and padded constants for the round operations. After the SHA-2 round operations have been performed, the SHA-2 states are updated and stored back to the register specified by the first operand. In one embodiment, one or more rounds of SHA-2 round operations are performed in response to a single SIMD instruction, where the registers involved have at least 256 bits to store the SHA-2 state variables and message inputs for SHA-256 round operations (and 512 bits for SHA-512 round operations).

According to another embodiment, in response to a second instruction, the SHA-2 unit 106 is configured to perform SHA-2 message scheduling operations to produce multiple message inputs for the next cycle (e.g., one or more rounds of SHA-2 round operations in a next SIMD instruction cycle). In one embodiment, there may be two instructions needed to prepare the message inputs for the next SIMD cycle dependent upon the specific design or configuration of the processor pipeline. In supporting at least two rounds of SHA-2 round operations in a single SIMD cycle, the first instruction includes three operands to store at least 8 previous message inputs and after the first instruction is executed, an intermediate result is generated and returned in a register specified in one of the operands. The second instruction takes the intermediate result generated from the first instruction as an input in one operand. Another operand of the second instruction specifies at least 8 other previous message inputs (e.g., a total 16 message inputs in combined). The final result represents 4 message inputs for the next SIMD cycle. In one embodiment, registers involved in the message scheduling operations have at least 128 bits.

According to some embodiments, embodiments of the invention include a new instruction and data path that utilizes an YMM SIMD register, which has 256 bits and is compatible with an AVX processor from Intel Corporation of Santa Clara, Calif., as a source/destination operand for the 256 bits of SHA-256 state. Wider registers (e.g., 512-bit or wider registers) can be utilized to perform wider bit SHA-2 round operations, such as SHA-512 round operations. Throughout this application, SHA-256 of SHA-2 standard is described for the purpose of illustration; however, other operations such as SHA-512 of the SHA-2 standard may also be applied.

According to one embodiment, the SHA224/256 operations can be improved using a new instruction which calculates two rounds with 3 cycle latency (e.g., 3 cycle pipeline). The eight 32-bit state variables A through H are stored in a 256-bit register such as an YMM register of the Intel AVX processor. A new instruction to perform at least two rounds of SHA-256 round operations in a single SIMD cycle is referred to herein as SHA256RNDS2 (e.g., SHA-256 2 rounds) instruction. The SHA256RNDS2 instruction uses a first 256-bit register (e.g., first YMM register) to contain the state variables (e.g., SHA-2 states A to H) as a source/destination register, plus a second 256-bit register (e.g., second YMM register) that contains two pre-calculated message inputs plus round constant values. In order to derive message inputs and add the round constants ahead of the SHA-256 round iterations, according to one embodiment, two message scheduling instructions, referred to herein as MSG1SHA256 and MSG2SHA256 instructions, are implemented to speed up the complex scheduling function consisting of rotates, shifts, XORs, and three 32-bit carry propagate additions.

In one embodiment, the SHA256RNDS2 instruction requires 3 cycles to read the state and K message inputs from the YMM registers, to perform 2 rounds of SHA-256, and to write the updated state back to the source/destination YMM register. With 3-cycle latency for 2 rounds of SHA 256, the throughput rate is ⅔ of a round per cycle, or 96 cycles for per 512 bit block requiring 64 rounds of processing. The message inputs w[i] for rounds 1 to 16 are supplied from 4 byte partitions of the 64 byte data block being hashed. W[i] for rounds 17 to 64 are derived from the 64 byte/16 words of input data with a complex message scheduler requiring 4 rotates, 2 shifts, 4 XORS, and 4 carry propagate adds per message word for each round. The operations can be defined as follows:

for i from 16 to 63

$$w[i]:=w[i-16]+s0(w[i-15])+w[i-7]+s1(w[i-2])$$

where function s0 can be defined as:

$$s0(x)=(x\ ROTR\ 7) XOR(x\ ROTR\ 18) XOR(x\ SHR\ 3)$$

and where function s1 can be defined as:

$$s1(x)=(x\ ROTR\ 17) XOR(x\ ROTR\ 19) XOR\ (x\ SHR\ 10)$$

Figure 3:
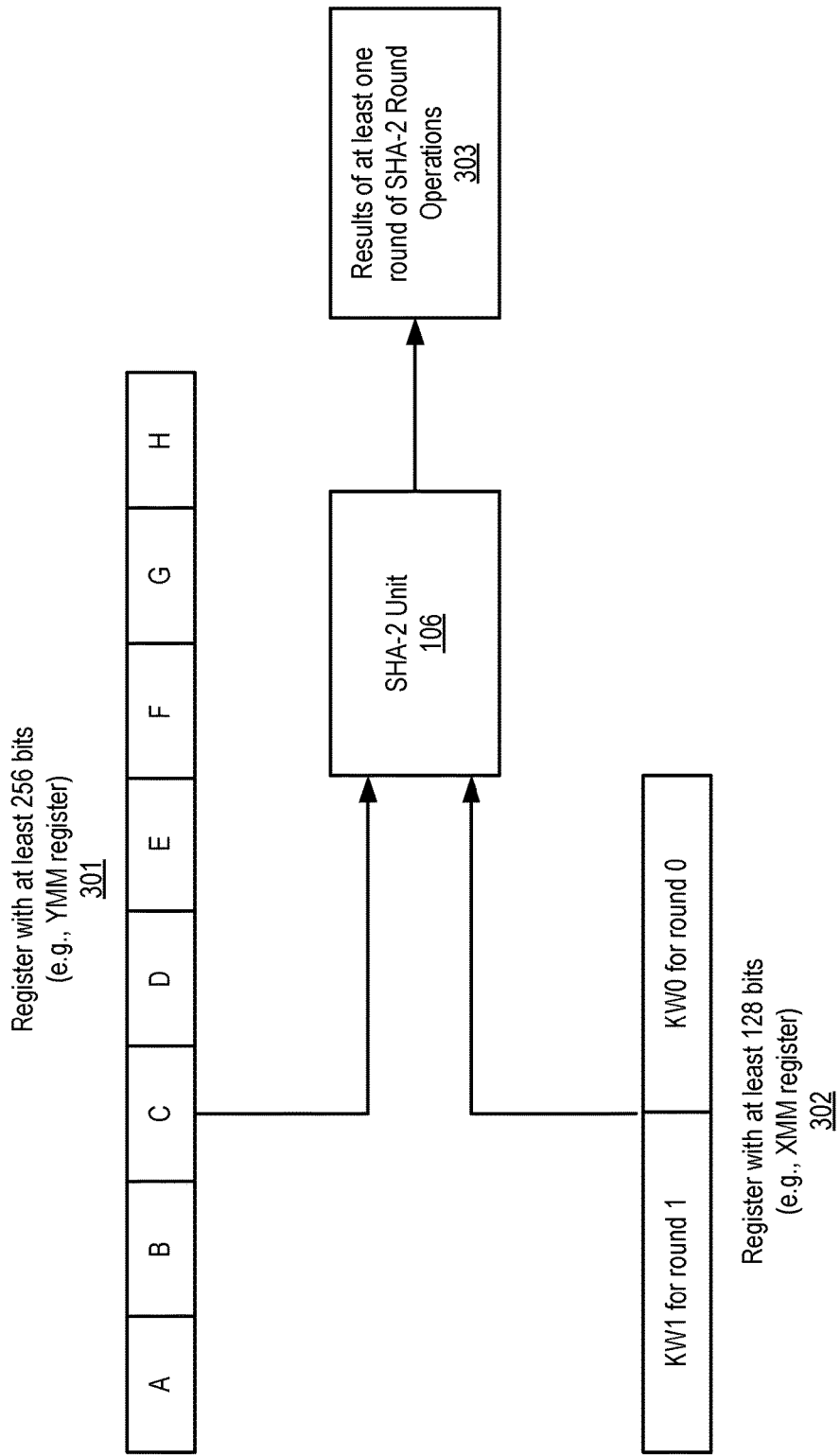
FIG. 3 is a block diagram illustrating a SHA-2 operation according to one embodiment.

In one embodiment, the format of the SHA256RNDS2 instruction can be defined as follows:

SHA256RNDS2, YMM1, YMM2/m256 where YMM1 is source/destination register to store SHA-256 state variables A, B, C, D, E, F, G, and H. The SHA256RNDS2 instruction updates the destination YMM1 register with the resulting new state after 2 rounds of SHA256 iterations. YMM2 is a source register with 2 new message inputs and pre-added round constants. Input kw0 for round 0 is stored in register YMM2[31:00] and input kw1 for round 1 is stored in register YMM2[63:32], as shown in FIG. 3. Note that referring to FIG. 3, in this example, SHA-2 unit 106 is to compute two rounds of SHA-256 round operations on SHA-2 states 301 and one of the KWs stored in register 302, which generates next SHA-2 states 303. The next SHA-2 states 303 may be stored back in source/destination register 301. Since register 302, in this example, having at least 128 bits, can store more KWs, an additional round of SHA-2 round operations may also be performed. Similarly, if register 302 has 256 bits or 512 bits, more rounds can be performed, as long as the pipeline latency can be satisfied.

In one embodiment, the YMM1 register can be defined as follows:

A=YMM[255:224]

B=YMM[223:192]

C=YMM[191:160]

D=YMM[159:128]

E=YMM[127:96]

F=YMM[95:64]

G=YMM[63:32]

H=YMM[31:00]

where state variables A, B, C, D, E, F, G, and H (for round n)←state variables A, B, C, D, E, F, G, and H (for round n−2) stepped for 2 SHA-256 rounds.

To keep pace with the SHA256RNDS2 instruction, according to one embodiment, two specialized instructions performing the SHA-256 message schedule are provided, referred to herein as instructions MSG1SHA256 and MSG2SHA256. In one embodiment, for a current round i of SHA-256 round operations, instruction MSG1SHA256 is to calculate four intermediate messages based on previous calculated messages as follows:

$$Word0=s0(w[i-15])+w[i-16]$$

$$Word1=s0(w[i-14])+w[i-15]$$

$$Word2=s0(w[i-13])+w[i-14]$$

$$Word3=s0(w[i-12])+w[i-13]$$

In one embodiment, for a current round i of SHA-256 round operations, instruction MSG2SHA256 is to calculate four messages for the next iteration based on previous calculated messages and the intermediate messages produced by instruction MSG2SHA256 as follows:

$$w[i]=Word0Msg1+s1(w[i-2])+w[i-7]$$

$$w[i+1]=Word1Msg1+s1(w[i-1])+w[i-6]$$

$$w[i+2]=Word2Msg1+s1(w[i])+w[i-5]$$

$$w[i+3]=Word3Msg1+s1(w[i+1])+w[i-4]$$

where Word0Msg1, Word1Msg1, Word2Msg1, and Word3Msg1 are produced by instruction MSG1SHA256 (e.g., corresponding to Word0, Word1, Word2, and Word 3 above), for example, in another pipeline stage.

Note that w[i+2] and w[i+3] are calculated based on w[i] and w[i+1] by instruction MSG2SHA256. Thus, w[i+2] and w[i+3] cannot be calculated before the calculation of w[i] and w[i+1] is completed. If this causes the total time required to calculate w[i+2] and w[i+3] exceed the allocated time for a single SIMD instruction pipeline, then the MSG2SHA256 instructions can be partitioned into two separate instructions, i.e. MSG2ASHA256 and MSG2BSHA256. The MSG2ASHA256 will calculate w[i] and w[i+1] while MSG2BSHA256 will calculate w[i+2] and w[i+3].

In one embodiment, instruction MSG1SHA256 may be defined as follows:

MSG1SHA256 XMM0, XMM1, XMM2 where registers XMM0, XMM1, and XMM2 represent registers having at least 128 bits such as those XMM registers available from the Intel AVX processor family Instruction MSG1SHA256 performs an intermediate calculation for the next four SHA256 message inputs. The SHA-256 schedules message input w for rounds 16 to 63 as follows:

$$w[i]:=w[i-16]+s0(w[i-15])+w[i-7]+s1(w[i-2])$$

In one embodiment, input XMM2 represents messages w(i−13), w(i−14), w(i−15), and w(i−16). An embodiment of the format of XMM2 can be defined as follows:

XMM2[127:96]=w(i−13)

XMM2[95:64]=w(i−14)

XMM2[63:32]=w(i−15)

XMM2[31:00]=w(i−16)

Input XMM1 represents messages w(i−9), w(i−10), w(i−11), and w(i−12). An embodiment of the format of XMM2 can be defined as follows:

XMM1[127:96]=$w(i-9)$

XMM1[95:64]=$w(i-10)$

XMM1[63:32]=$w(i-11)$

XMM1[31:00]=$w(i-12)$

Output XMM0 represents w(i−13)+s0(w(i−12)), w(i−14)+s0(w(i−13)), w(i−15)+s0(w(i−14)), and w(i−16)+s0(w(i−15)). An embodiment of the format of XMM0 can be defined as follows:

XMM0[127:96]=$w(i-13)+s0(w[i-12])$

XMM0[95:64]=$w(i-14)+s0(w[i-13])$

XMM0[63:32]=$w(i-15)+s0(w[i-14])$

XMM0[31:00]=$w(i-16)+s0(w[i-15])$ where XMM0[127:96] represents Msg1(i−13) for determining w(i+3); XMM0[95:64] represents Msg1(i−14) for determining w(i+2); XMM0[63:32] represents Msg1(i−15) for determining w(i+1); and XMM0[31:00] represents Msg1(i−16) for determining w(i).

In one embodiment, instruction MSG2SHA256 may be defined as follows:

MSG2SHA256 XMM0, XMM1,XMM2 where registers XMM0, XMM1, and XMM2 represent registers having at least 128 bits such as those XMM registers available from Intel AVX processor family. Instruction MSG2SHA256 performs calculation for the next four SHA-256 message inputs using the XMM result register of the previously calculated MSG1SHA256 instruction which contains the msg1 values for w(i−13) to w(i−16), the XMM register holding message inputs w(i−5) to w(i−8), and the XMM register holding message inputs w(i−1) to w(−4).

In one embodiment, SHA-256 schedules message input w for rounds 16 to 63 as follows:

$w[i]:=w[i-16]+s0(w[i-15])+w[i-7]+s1(w[i-2])$ $w[i+1]:=msg1[i-15]+w[i-6]+s1(w(i-1))$ where intermediate result msg[i−15] was produced by instruction MSG1SHA256, for example, in another pipeline stage. Messages w(i) and w(i+1) are used to complete the calculation of w(i+2) and w(i+3), for example, with delay in between, as follows:

$w[i+3]:=msg1[i-13]+w[i-4]+s1(w(i+1))$ $w[i+2]:=msg1[i-14]+w[i-5]+s1(w(i))$ where intermediate results msg[i−13] and msg[i−14] were produced by instruction MSG1SHA256, for example, in another pipeline stage.

In one embodiment, inputs of instruction MSG2SHA256 include three registers with at least 128 bits, such as XMM registers of the Intel AVX processor family. In one embodiment, for a current round i of SHA-256 round operations, input XMM2 represents messages w(i−5), w(i−6), w(i−7), and w(i−8) as follows:

XMM2[127:96]=$w(i-5)$

XMM2[95:64]=$w(i-6)$

XMM2[63:32]=$w(i-7)$

XMM2[31:00]=$w(i-8)$

In one embodiment, for a current round i of SHA-256 round operations, input XMM1 represents messages w(i−1), w(i−2), w(i−3), and w(i−4) as follows:

XMM1[127:96]=$w(i-1)$

XMM1[95:64]=$w(i-2)$

XMM1[63:32]=$w(i-3)$

XMM1[31:00]=$w(i-4)$

In one embodiment, for a current round i of SHA-256 round operations, input XMM0 represents intermediate messages Msg1(i−13), Msg1(i−14), Msg1(i−15), and Msg1(i−16), produced by MSG1SHA256 instruction, as follows:

XMM0[127:96]=$w(i-13)$ AND $s0(wi-12)$

XMM0[95:64]=$w(i-14)$ AND $s0(wi-13)$

XMM0[63:32]=$w(i-15)$ AND $s0(wi-14)$

XMM0[31:00]=$w(i-16)$ AND $s0(wi-15)$

In one embodiment, for a current round i of SHA-256 round operations, output XMM0 represents messages w(i+3), w(i+2), w(i+1), and w(i) as follows:

XMM0[127:96]=$w(i+3)$

XMM0[95:64]=$w(i+2)$

XMM0[63:32]=$w(i+1)$

XMM0[31:00]=$w(i)$

Figure 1:
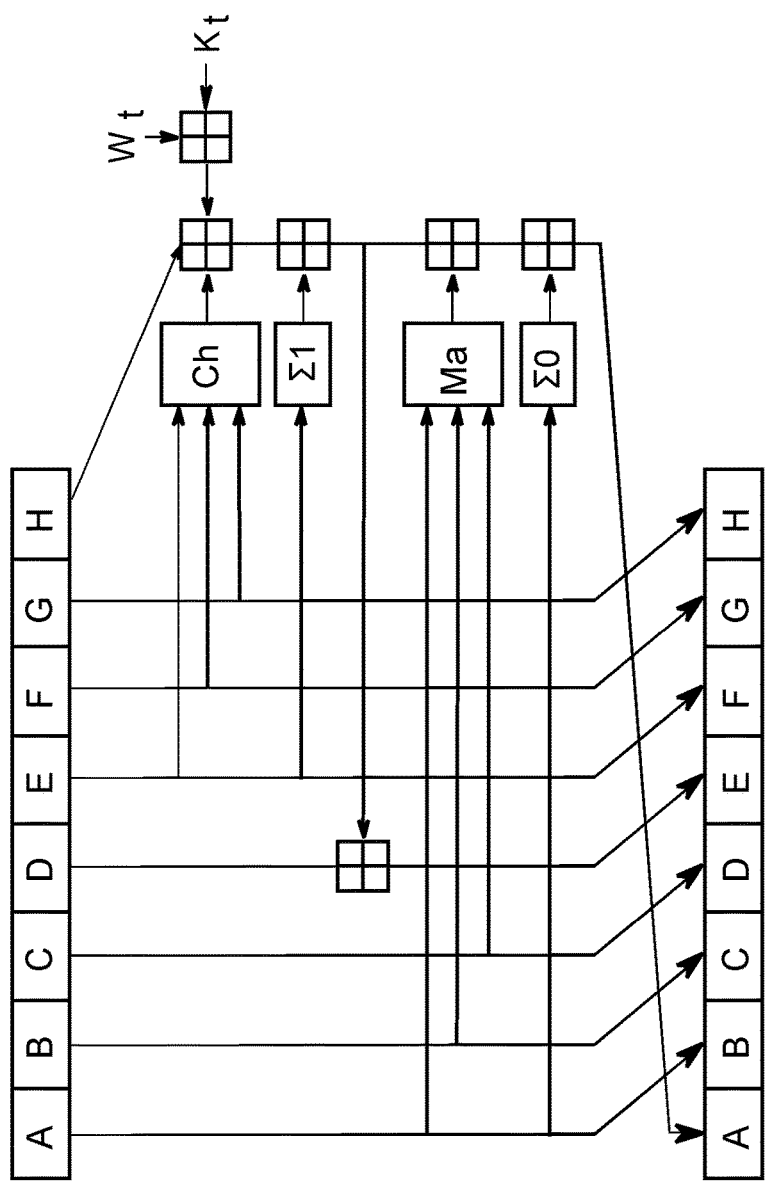
FIG. 1 depicts details of the SHA-2 algorithm.
Figure 4:
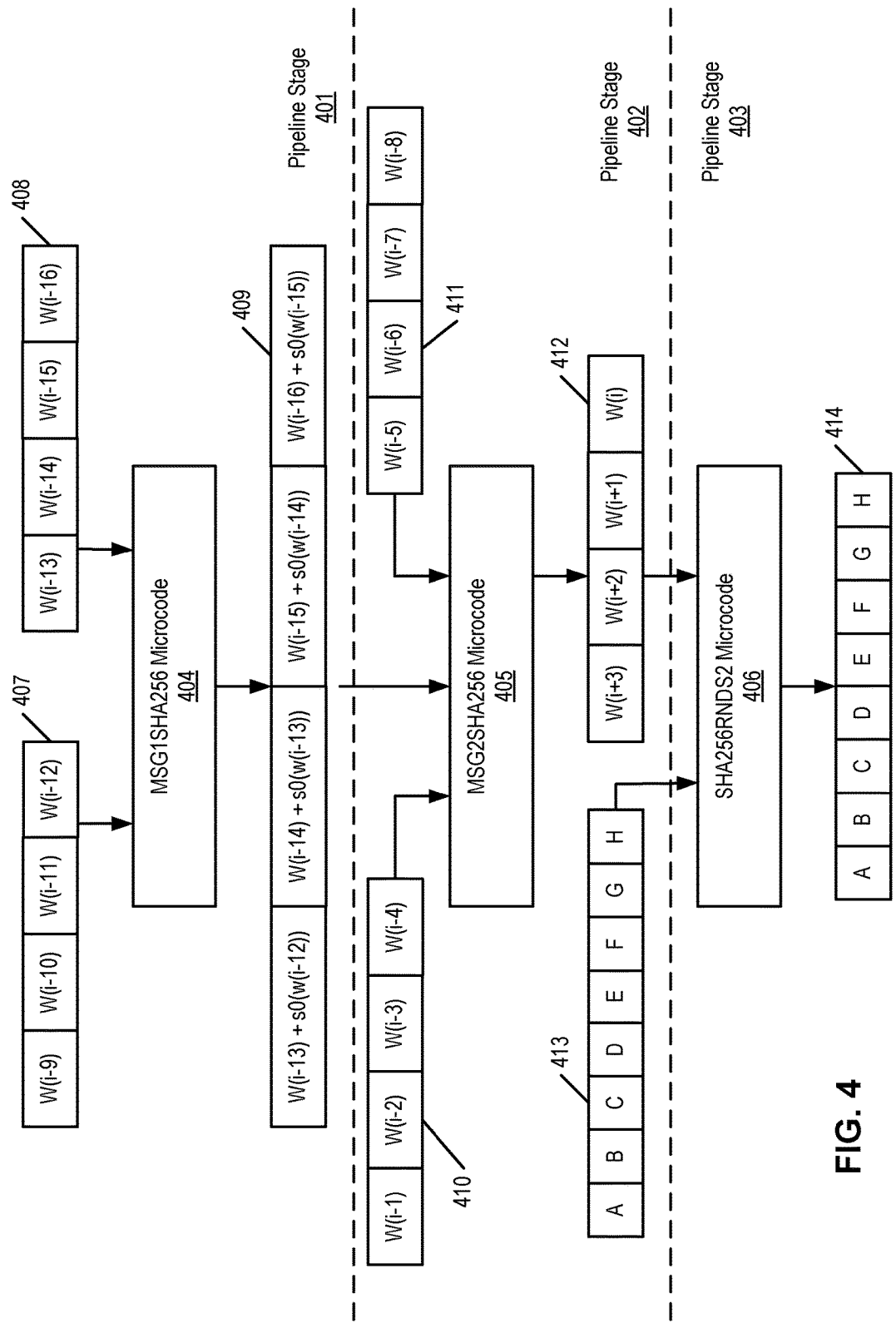
FIG. 4 is a block diagram illustrating a process for SHA-256 round operations according to one embodiment.

FIG. 4 is a block diagram illustrating a process for SHA-256 round operations according to one embodiment. Referring to FIG. 4, an embodiment of the process can be defined with at least three pipeline stages 401-403 of a processor or processor core. Note that pipeline stages 401-403 may or may not be consecutive pipeline stages dependent upon the specific design or configuration of the processor. MSG1SHA256 microcode 404, MSG2SHA256 microcode 405, and SHA256RNDS2 microcode 406 may be implemented as part of SHA-2 unit 106 of FIG. 1.

According to one embodiment, in response to instruction MSG1SHA256, MSG1SHA256 microcode 404 is to perform a first part of SHA-256 message scheduling operations as described above. For a given round i of SHA-256 round operations, during pipeline stage 401, MSG1SHA256 microcode 404 is to perform the first part of the message scheduling operations on previously generated messages 407-408 and to generate intermediate message 409.

According to one embodiment, in response to instruction MSG2SHA256, MSG2SHA256 microcode 405 is to perform a second part of SHA-256 message scheduling operations as described above. For a given round i of SHA-256 round operations, during pipeline stage 402, MSG2SHA256 microcode 405 is to perform the second part of the message scheduling operations on previously generated messages 410-411 and intermediate message 409, and to generate message 412.

According to one embodiment, in response to instruction SHA256RNDS2, SHA256RNDS2 microcode 406 is to perform a round of SHA-256 round operations as described above. For a given round i of SHA-256 round operations, during pipeline stage 403, SHA256RNDS2 microcode 406 is to perform a round operation on messages 412 and current SHA-256 states 413, and to generate SHA-256 states 414 for next round or iteration. Note that in this example, each of w(i+3), w(i+2), w(i+1), and w(i) stored in register 412 has 32 bits. It can be used to perform at least two rounds of SHA-256 round operations. If register 412 can store more message inputs, more rounds of SHA-256 round operations can also be performed, as long as the pipeline latency requirement can be satisfied.

Figure 5:
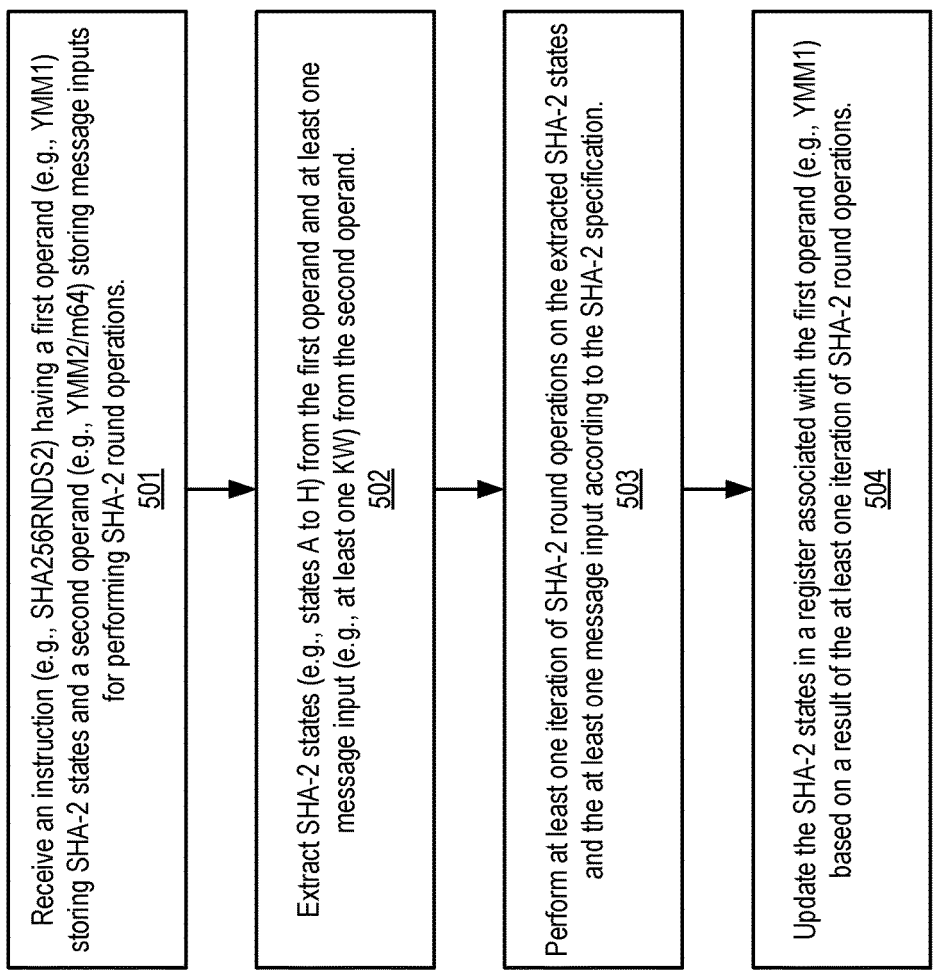
FIG. 5 is a flow diagram illustrating a method for performing SHA-2 round operations according to one embodiment.

FIG. 5 is a flow diagram illustrating a method for performing SHA-2 round operations according to one embodiment. Method 500 may be performed by SHA-2 unit 106 of FIG. 1. Referring to FIG. 5, at block 501, an instruction (e.g., SHA256RNDS2) is received, where the instruction includes a first operand (e.g., YMM1) and a second operand (e.g., YMM2). At block 502, SHA-2 states (e.g., states A to H) are extracted from the first operand and at least one message input (e.g., at least one KW) is extracted from the second operand. At block 503, at least one round of SHA-2 (e.g., SHA-256 round) round operations is performed on the SHA-2 states and the message input according to the SHA-2 specification. At block 504, the SHA-2 states are updated in a register specified by the first operand base on a result of the at least one round of SHA-2 round operations.

Figure 6:
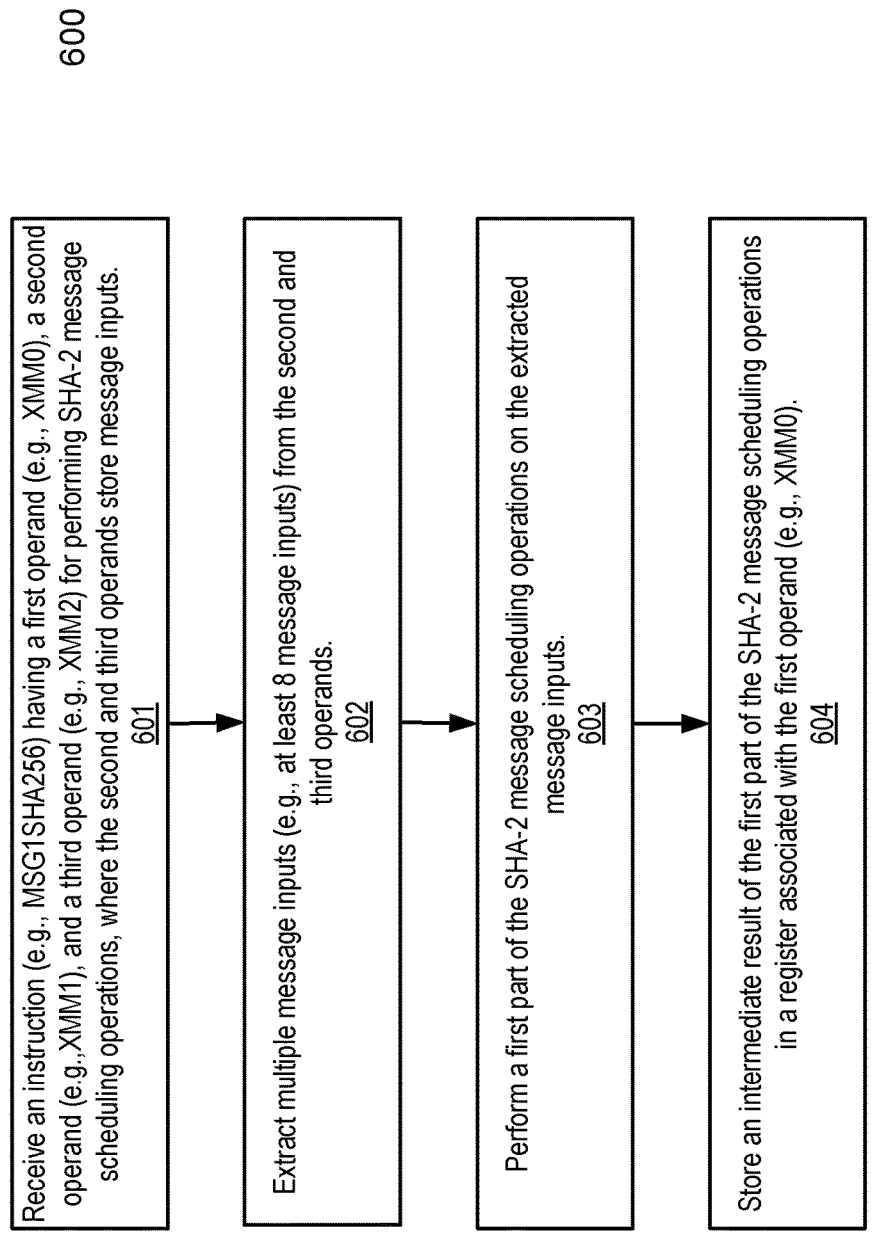
FIG. 6 is a flow diagram illustrating a method for performing SHA-2 message scheduling operations according to one embodiment.

FIG. 6 is a flow diagram illustrating a method for performing SHA-2 message scheduling operations according to one embodiment. Method 600 may be performed by SHA-2 unit 106 of FIG. 1 as a first part of the SHA-2 message scheduling operations. Referring to FIG. 6, at block 601, an instruction (e.g., MSG1SHA256) is received, where the instruction includes three operands (e.g., XMM0, XMM1, XMM2), each identifying a register with at least 128 bits. At block 602, multiple message inputs (e.g., 8 inputs) are extracted from the second and third operands (e.g., XMM1 and XMM2). At block 603, a first part of SHA-2 message scheduling operations is performed based on the message inputs. At block 604, an intermediate result is generated and stored in a register associated with the first operand (e.g., XMM0).

Figure 7:
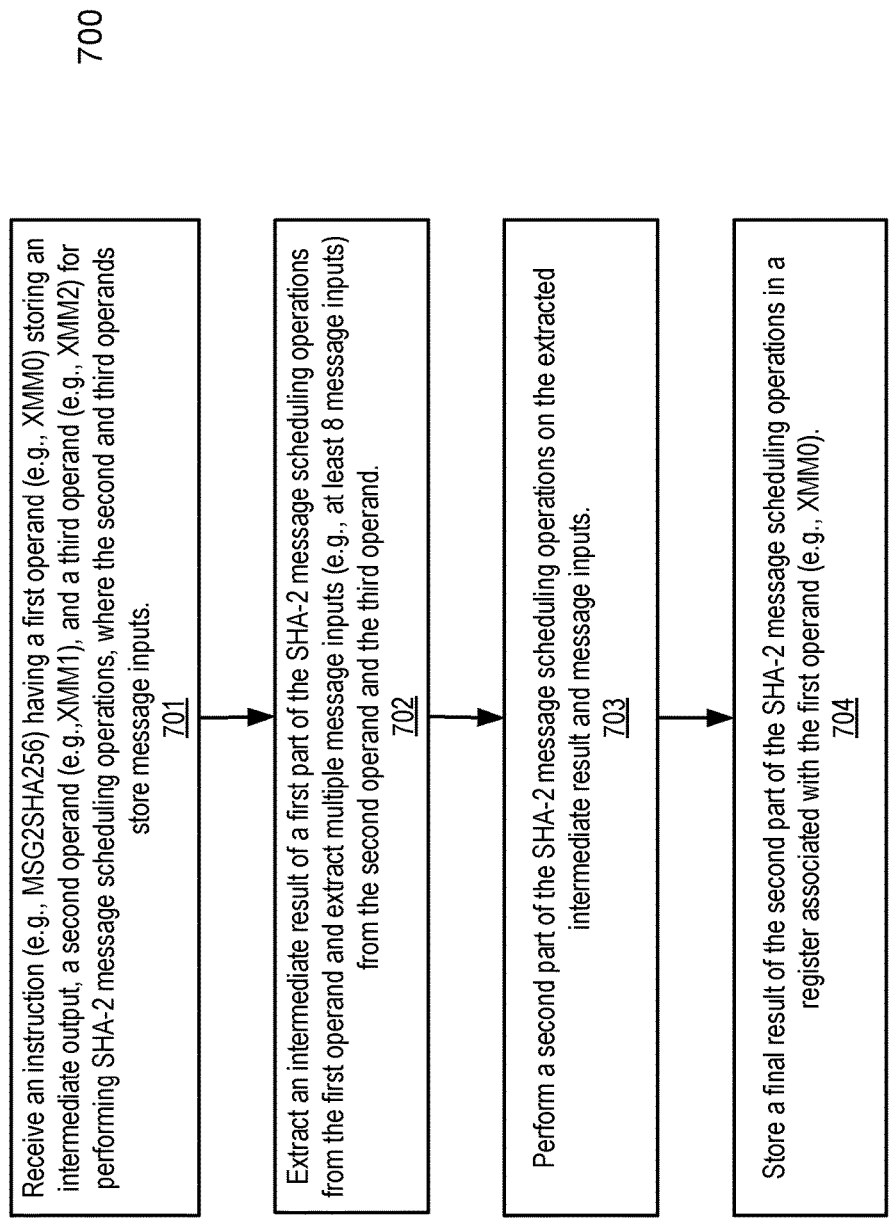
FIG. 7 is a flow diagram illustrating a method for performing SHA-2 message scheduling operations according to another embodiment.

FIG. 7 is a flow diagram illustrating a method for performing SHA-2 message scheduling operations according to one embodiment. Method 700 may be performed by SHA-2 unit 106 of FIG. 1 as a second part of the message scheduling operations. Referring to FIG. 7, at block 701, an instruction (e.g., MSG2SHA256) is received, where the instruction includes three operands (e.g., XMM0, XMM1, XMM2), each identifying a register with at least 128 bits. At block 702, an intermediate result of a first part of the SHA-2 scheduling operations is obtained from the first operand (e.g., XMM0) and multiple message inputs are obtained from the second and third operands (e.g., XMM1 and XMM2). At block 703, a second part of the SHA-2 message scheduling operations is performed based on the intermediate result and the message inputs. At block 704, a final result of the SHA-2 message scheduling operations is generated and stored in a register associated with the first operand (e.g., XMM0).

FIGS. 8A-8C are pseudocode illustrating a process of SHA-256 round operations according to one embodiment. Referring to FIGS. 8A-8C, in this example, YMM registers having 256 bits are utilized to store the message inputs, where each message input includes 32 bits. An YMM register can actually store at least four (up to eight) message inputs, where each message input has 32 bits. As a result, for each iteration, at least four rounds of SHA-256 can be performed via two of instruction SHA256RNDS2, for example, as shown on lines 801 and 802 of FIG. 8A. Note that XMM registers work for calculating four message terms in parallel. If YMM registers are used for 4 terms at a time, the upper 128 bits are not used. For calculating 8 message terms, MSG1 with a YMM register works well, but MSG2 may be split into 2 or 4 instructions. As described above, more or fewer rounds can also be performed in each iteration, dependent upon the specific configuration of the processor or processor core.

An example of embodiments of the invention includes a processor having an instruction decoder to receive a first instruction to process a secure hash algorithm 2 (SHA-2) hash algorithm, the first instruction having a first operand to store a SHA-2 state and a second operand to store a plurality of messages and round constants; and an execution unit coupled to the instruction decoder, in response to the first instruction, to perform one or more rounds of the SHA-2 hash algorithm on the SHA-2 state specified in the first operand and the plurality of messages and round constants specified in the second operand. The first operand specifies a first register having at least 256 bits or 512 bits to store data of SHA-2 state variables to perform SHA-256 round operations or SHA-512 round operations, respectively. The second operand specifies a second register or a memory location having at least 64 bits or 128 bits to store at least two messages and round constants for the SHA-256 round operations or SHA-512 round operations, respectively. At least two rounds of the SHA-2 algorithm are performed in response to the first instruction as a single instruction multiple data (SIMD) instruction. The instruction decoder receives a second instruction, and wherein in response to the second instruction, the execution unit is configured to perform a first part of message scheduling operations based on a plurality of first previous messages specified by the second instruction, generating an intermediate result. The second instruction includes a third operand, a fourth operand, and a fifth operand. For a current round i of SHA-2 round operations, the third operand specifies a register to store messages w(i−13), w(i−14), w(i−15), and w(i−16). The fourth operand specifies a register to store messages w(i−9), w(i−10), w(i−11), and w(i−12). The intermediate result is stored in a register specified by the fifth operand. The intermediate result comprises w(i−3)+s0(w(i−12)), w(i−14)+s0(w(i−13)), w(i−15)+s0(w(i−14)), w(i−16)+s0(w(i−15)), where function s0(x) is represented by s0(x)=(x ROTR 7)XOR(x ROTR 18)XOR(x ROTR 3). The instruction decoder receives a third instruction, where in response to the third instruction, the execution unit is configured to perform a second part of the message scheduling operations on second previous messages and the intermediate result specified in the third instruction, generating next input messages for one or more rounds operations of the SHA-2 algorithm to be performed during a next iteration of one or more rounds of SHA-2 algorithm. The third instruction includes a sixth operand, a seventh operand, and an eighth operand, where for a current round i of SHA-2 round operations, the sixth operand specifies a register to store message w(i−5), w(i−6), w(i−7), and w(i−8). The seventh operand specifies a register to store messages w(i−1), w(i−2), w(i−3), and w(i−4). The next input messages comprise w(i), w(i+1), w(i+2), and w(i+3) to be stored in a register specified by the eighth operand.

An example of embodiments of the invention includes a method, including receiving, at an instruction decoder, a first instruction to process a secure hash algorithm 2 (SHA-2) hash algorithm, the first instruction having a first operand to store a SHA-2 state and a second operand to store a plurality of messages and round constants; and performing, by an execution unit coupled to the instruction decoder in response to the first instruction, one or more rounds of the SHA-2 hash algorithm on the SHA-2 state specified in the first operand and the plurality of messages and round constants specified in the second operand. The the first operand specifies a first register having at least 256 bits or 512 bits to store data of SHA-2 state variables to perform SHA-256 round operations or SHA-512 round operations, respectively. The second operand specifies a second register or a memory location having at least 64 bits or 128 bits to store at least two messages and round constants for the SHA-256 round operations or SHA-512 round operations, respectively. At least two rounds of the SHA-2 algorithm are performed in response to the first instruction as a single instruction multiple data (SIMD) instruction. The method further includes receiving, by the instruction decoder, a second instruction having a third operand, a fourth operand, and a fifth operand; in response to the second instruction, performing, by the execution unit, a first part of message scheduling operations based on a plurality of first previous messages specified by the second instruction; and generating an intermediate result. For a current round i of SHA-2 round operations, the third operand specifies a register to store messages w(i−13), w(i−14), w(i−15), and w(i−16), where the fourth operand specifies a register to store messages w(i−9), w(i−10), w(i−11), and w(i−12), and where the intermediate result is stored in a register specified by the fifth operand. The intermediate result comprises w(i−3)+s0(w(i−12)), w(i−14)+s0(w(i−13)), w(i−15)+s0(w(i−14)), w(i−16)+s0(w(i−15)), and where function s0(x) is represented by s0(x)=(x ROTR 7)XOR(x ROTR 18)XOR(x ROTR 3). The method further includes receiving, by the instruction decoder, a third instruction having a sixth operand, a seventh operand, and an eighth operand; in response to the third instruction, performing, by the execution, a second part of the message scheduling operations on second previous messages and the intermediate result specified in the third instruction; and generating next input messages for one or more rounds operations of the SHA-2 algorithm to be performed during a next iteration of one or more rounds of SHA-2 algorithm. For a current round i of SHA-2 round operations, the sixth operand specifies a register to store message w(i−5), w(i−6), w(i−7), and w(i−8), where the seventh operand specifies a register to store messages w(i−1), w(i−2), w(i−3), and w(i−4), and where the next input messages comprise w(i), w (i+1), w(i+2), and w(i+3) to be stored in a register specified by the eighth operand. An example of embodiments of the invention further includes a data processing system having an interconnect, a processor coupled the interconnect to perform a method set forth above, and a dynamic random access memory (DRAM) coupled to the interconnect.

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance An additional set of SIMD extensions, referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 9A illustrates an exemplary AVX instruction format including a VEX prefix 2102, real opcode field 2130, Mod R/M byte 2140, SIB byte 2150, displacement field 2162, and IMM8 2172. FIG. 9B illustrates which fields from FIG. 9A make up a full opcode field 2174 and a base operation field 2142. FIG. 9C illustrates which fields from FIG. 9A make up a register index field 2144.

VEX Prefix (Bytes 0-2) 2102 is encoded in a three-byte form. The first byte is the Format Field 2140 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 2105 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 2115 (VEX byte 1, bits [4:0]—mmmmm) includes content to encode an implied leading opcode byte. W Field 2164 (VEX byte 2, bit [7]—W)—is represented by the notation VEX.W, and provides different functions depending on the instruction. The role of VEX.vvvv 2120 (VEX Byte 2, bits [6:3]—vvvv) may include the following: 1) VEX.vvvv encodes the first source register operand, specified in inverted (1 s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 2168 Size field (VEX byte 2, bit [2]—L)=0, it indicates 128 bit vector; if VEX.L=1, it indicates 256 bit vector. Prefix encoding field 2125 (VEX byte 2, bits [1:0]—pp) provides additional bits for the base operation field.

Real Opcode Field 2130 (Byte 3) is also known as the opcode byte. Part of the opcode is specified in this field. MOD R/M Field 2140 (Byte 4) includes MOD field 2142 (bits [7-6]), Reg field 2144 (bits [5-3]), and R/M field 2146 (bits [2-0]). The role of Reg field 2144 may include the following: encoding either the destination register operand or a source register operand (the rrr of Rrrr), or be treated as an opcode extension and not used to encode any instruction operand. The role of R/M field 2146 may include the following: encoding the instruction operand that references a memory address, or encoding either the destination register operand or a source register operand.

Scale, Index, Base (SIB)—The content of Scale field 2150 (Byte 5) includes SS2152 (bits [7-6]), which is used for memory address generation. The contents of SIB.xxx 2154 (bits [5-3]) and SIB.bbb 2156 (bits [2-0]) have been previously referred to with regard to the register indexes Xxxx and Bbbb. The Displacement Field 2162 and the immediate field (IMM8) 2172 contain address data.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
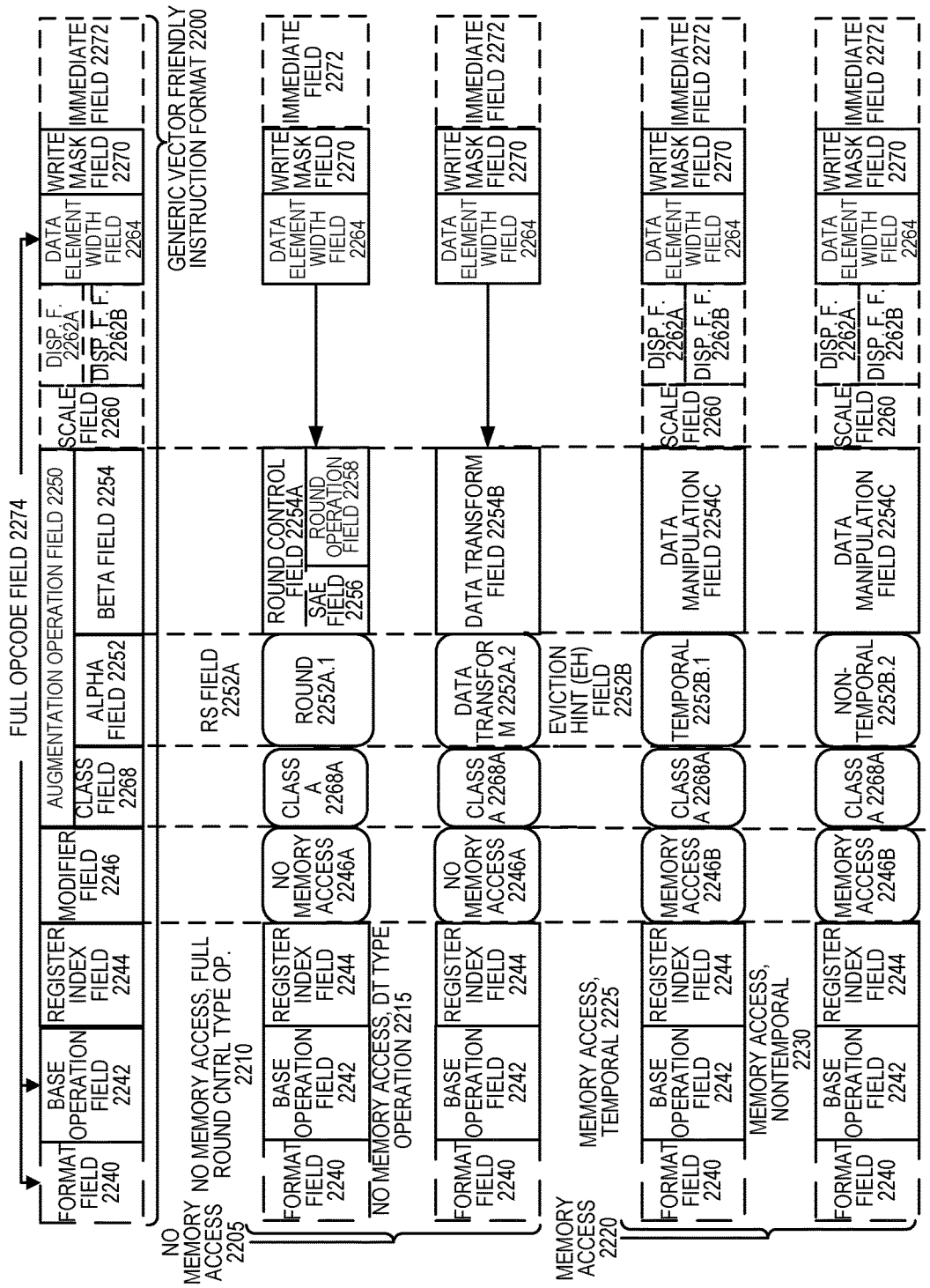
FIG. 10A is a block diagram illustrating a generic vector friendly instruction format and class A instruction templates thereof according to embodiments of the invention.
Figure 10B:
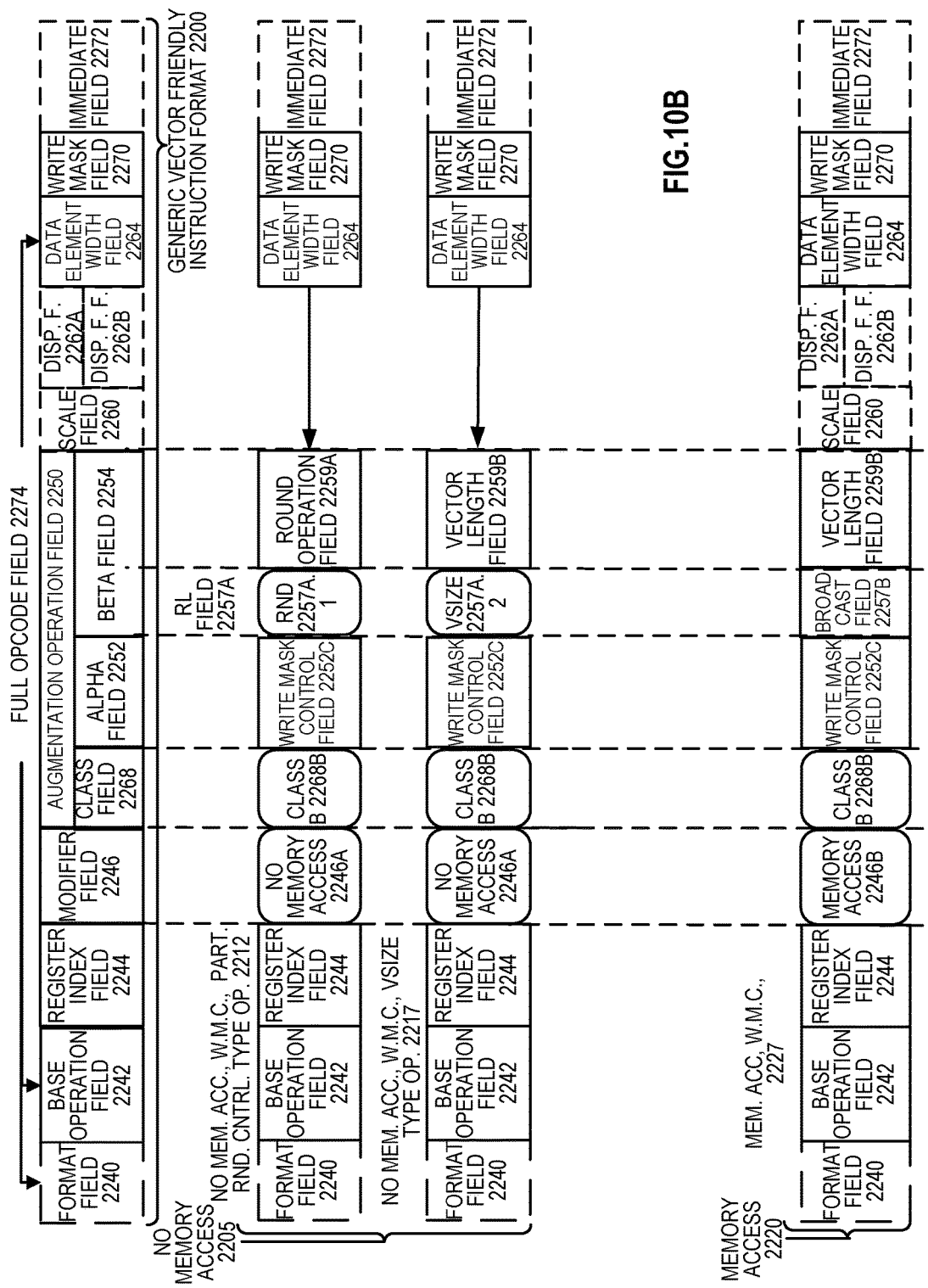
FIG. 10B is a block diagram illustrating the generic vector friendly instruction format and class B instruction templates thereof according to embodiments of the invention.

FIG. 10A, FIG. 10B, and FIG. 10C are block diagrams illustrating a generic vector friendly instruction format and instruction templates thereof according to embodiments of the invention. FIG. 10A is a block diagram illustrating a generic vector friendly instruction format and class A instruction templates thereof according to embodiments of the invention; while FIG. 10B is a block diagram illustrating the generic vector friendly instruction format and class B instruction templates thereof according to embodiments of the invention. Specifically, a generic vector friendly instruction format 2200 for which are defined class A and class B instruction templates, both of which include no memory access 2205 instruction templates and memory access 2220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 2205 instruction templates there is shown a no memory access, full round control type operation 2210 instruction template and a no memory access, data transform type operation 2215 instruction template; and 2) within the memory access 2220 instruction templates there is shown a memory access, temporal 2225 instruction template and a memory access, non-temporal 2230 instruction template. The class B instruction templates in FIG. 10B include:

1) within the no memory access 2205 instruction templates there is shown a no memory access, write mask control, partial round control type operation 2212 instruction template and a no memory access, write mask control, vsize type operation 2217 instruction template; and
2) within the memory access 2220 instruction templates there is shown a memory access, write mask control 2227 instruction template.

The generic vector friendly instruction format 2200 includes the following fields listed below in the order illustrated in FIG. 10A and FIG. 10B. Format field 2240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format. Base operation field 2242—its content distinguishes different base operations.

Register index field 2244—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2246—its content distinguishes occurrences of instructions in the generic vector instruction format that specify memory access from those that do not; that is, between no memory access 2205 instruction templates and memory access 2220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2250—its content distinguishes which one of a variety of different operations to be performed in addition to the base operation. This field is context specific. In one embodiment of the invention, this field is divided into a class field 2268, an alpha field 2252, and a beta field 2254. The augmentation operation field 2250 allows common groups of operations to be performed in a single instruction rather than 2, 3, or 4 instructions. Scale field 2260—its content allows for the scaling of the index field's content for memory address generation (e.g., for address generation that uses $2^{scale}*\text{index}+\text{base}$).

Displacement Field 2262A—its content is used as part of memory address generation (e.g., for address generation that uses $2^{scale}*\text{index}+\text{base}+\text{displacement}$). Displacement Factor Field 2262B (note that the juxtaposition of displacement field 2262A directly over displacement factor field 2262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2274 (described later herein) and the data manipulation field 2254C. The displacement field 2262A and the displacement factor field 2262B are optional in the sense that they are not used for the no memory access 2205 instruction templates and/or different embodiments may implement only one or none of the two.

Data element width field 2264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2270 allows for partial vector operations, including loads, stores, arithmetic, logical, etc. While embodiments of the invention are described in which the write mask field's 2270 content selects one of a number of write mask registers that contains the write mask to be used (and thus the write mask field's 2270 content indirectly identifies that masking to be performed), alternative embodiments instead or additional allow the mask write field's 2270 content to directly specify the masking to be performed.

Immediate field 2272—its content allows for the specification of an immediate. This field is optional in the sense that is it not present in an implementation of the generic vector friendly format that does not support immediate and it is not present in instructions that do not use an immediate. Class field 2268—its content distinguishes between different classes of instructions. With reference to FIG. 10A and FIG. 10B, the contents of this field select between class A and class B instructions. In FIG. 10A and FIG. 10B, rounded corner squares are used to indicate a specific value is present in a field (e.g., class A 2268A and class B 2268B for the class field 2268 respectively in FIG. 10A and FIG. 10B).

In the case of the non-memory access 2205 instruction templates of class A, the alpha field 2252 is interpreted as an RS field 2252A, whose content distinguishes which one of the different augmentation operation types are to be performed (e.g., round 2252A.1 and data transform 2252A.2 are respectively specified for the no memory access, round type operation 2210 and the no memory access, data transform type operation 2215 instruction templates), while the beta field 2254 distinguishes which of the operations of the specified type is to be performed. In the no memory access 2205 instruction templates, the scale field 2260, the displacement field 2262A, and the displacement scale filed 2262B are not present.

In the no memory access full round control type operation 2210 instruction template, the beta field 2254 is interpreted as a round control field 2254A, whose content(s) provide static rounding. While in the described embodiments of the invention the round control field 2254A includes a suppress all floating point exceptions (SAE) field 2256 and a round operation control field 2258, alternative embodiments may support may encode both these concepts into the same field or only have one or the other of these concepts/fields (e.g., may have only the round operation control field 2258).

SAE field 2256—its content distinguishes whether or not to disable the exception event reporting; when the SAE field's 2256 content indicates suppression is enabled, a given instruction does not report any kind of floating-point exception flag and does not raise any floating point exception handler.

Round operation control field 2258—its content distinguishes which one of a group of rounding operations to perform (e.g., Round-up, Round-down, Round-towards-zero and Round-to-nearest). Thus, the round operation control field 2258 allows for the changing of the rounding mode on a per instruction basis. In one embodiment of the invention where a processor includes a control register for specifying rounding modes, the round operation control field's 2250 content overrides that register value.

In the no memory access data transform type operation 2215 instruction template, the beta field 2254 is interpreted as a data transform field 2254B, whose content distinguishes which one of a number of data transforms is to be performed (e.g., no data transform, swizzle, broadcast).

In the case of a memory access 2220 instruction template of class A, the alpha field 2252 is interpreted as an eviction hint field 2252B, whose content distinguishes which one of the eviction hints is to be used (in FIG. 10A, temporal 2252B.1 and non-temporal 2252B.2 are respectively specified for the memory access, temporal 2225 instruction template and the memory access, non-temporal 2230 instruction template), while the beta field 2254 is interpreted as a data manipulation field 2254C, whose content distinguishes which one of a number of data manipulation operations (also known as primitives) is to be performed (e.g., no manipulation; broadcast; up conversion of a source; and down conversion of a destination). The memory access 2220 instruction templates include the scale field 2260, and optionally the displacement field 2262A or the displacement scale field 2262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Temporal data is data likely to be reused soon enough to benefit from caching. This is, however, a hint, and different processors may implement it in different ways, including ignoring the hint entirely. Non-temporal data is data unlikely to be reused soon enough to benefit from caching in the 1st-level cache and should be given priority for eviction. This is, however, a hint, and different processors may implement it in different ways, including ignoring the hint entirely.

In the case of the instruction templates of class B, the alpha field 2252 is interpreted as a write mask control (Z) field 2252C, whose content distinguishes whether the write masking controlled by the write mask field 2270 should be a merging or a zeroing.

In the case of the non-memory access 2205 instruction templates of class B, part of the beta field 2254 is interpreted as an RL field 2257A, whose content distinguishes which one of the different augmentation operation types are to be performed (e.g., round 2257A.1 and vector length (VSIZE) 2257A.2 are respectively specified for the no memory access, write mask control, partial round control type operation 2212 instruction template and the no memory access, write mask control, VSIZE type operation 2217 instruction template), while the rest of the beta field 2254 distinguishes which of the operations of the specified type is to be performed. In the no memory access 2205 instruction templates, the scale field 2260, the displacement field 2262A, and the displacement scale filed 2262B are not present.

In the no memory access, write mask control, partial round control type operation 2210 instruction template, the rest of the beta field 2254 is interpreted as a round operation field 2259A and exception event reporting is disabled (a given instruction does not report any kind of floating-point exception flag and does not raise any floating point exception handler).

Round operation control field 2259A—just as round operation control field 2258, its content distinguishes which one of a group of rounding operations to perform (e.g., Round-up, Round-down, Round-towards-zero and Round-to-nearest). Thus, the round operation control field 2259A allows for the changing of the rounding mode on a per instruction basis. In one embodiment of the invention where a processor includes a control register for specifying rounding modes, the round operation control field's 2250 content overrides that register value.

In the no memory access, write mask control, VSIZE type operation 2217 instruction template, the rest of the beta field 2254 is interpreted as a vector length field 2259B, whose content distinguishes which one of a number of data vector lengths is to be performed on (e.g., 128, 256, or 512 byte).

In the case of a memory access 2220 instruction template of class B, part of the beta field 2254 is interpreted as a broadcast field 2257B, whose content distinguishes whether or not the broadcast type data manipulation operation is to be performed, while the rest of the beta field 2254 is interpreted the vector length field 2259B. The memory access 2220 instruction templates include the scale field 2260, and optionally the displacement field 2262A or the displacement scale field 2262B.

With regard to the generic vector friendly instruction format 2200, a full opcode field 2274 is shown including the format field 2240, the base operation field 2242, and the data element width field 2264. While one embodiment is shown where the full opcode field 2274 includes all of these fields, the full opcode field 2274 includes less than all of these fields in embodiments that do not support all of them. The full opcode field 2274 provides the operation code (opcode).

The augmentation operation field 2250, the data element width field 2264, and the write mask field 2270 allow these features to be specified on a per instruction basis in the generic vector friendly instruction format. The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 11 is a block diagram illustrating an exemplary specific vector friendly instruction format according to embodiments of the invention. FIG. 11 shows a specific vector friendly instruction format 2300 that is specific in the sense that it specifies the location, size, interpretation, and order of the fields, as well as values for some of those fields. The specific vector friendly instruction format 2300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although embodiments of the invention are described with reference to the specific vector friendly instruction format 2300 in the context of the generic vector friendly instruction format 2200 for illustrative purposes, the invention is not limited to the specific vector friendly instruction format 2300 except where claimed. For example, the generic vector friendly instruction format 2200 contemplates a variety of possible sizes for the various fields, while the specific vector friendly instruction format 2300 is shown as having fields of specific sizes. By way of specific example, while the data element width field 2264 is illustrated as a one bit field in the specific vector friendly instruction format 2300, the invention is not so limited (that is, the generic vector friendly instruction format 2200 contemplates other sizes of the data element width field 2264).

The generic vector friendly instruction format 2200 includes the following fields listed below in the order illustrated in FIG. 11A. EVEX Prefix (Bytes 0-3) 2302—is encoded in a four-byte form. Format Field 2240 (EVEX Byte 0, bits [7:0])—the first byte (EVEX Byte 0) is the format field 2240 and it contains 0x62 (the unique value used for distinguishing the vector friendly instruction format in one embodiment of the invention). The second-fourth bytes (EVEX Bytes 1-3) include a number of bit fields providing specific capability.

REX field 2305 (EVEX Byte 1, bits [7-5])—consists of a EVEX.R bit field (EVEX Byte 1, bit [7]—R), EVEX.X bit field (EVEX byte 1, bit [6]—X), and 2257BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2210—this is the first part of the REX' field 2210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2315 (EVEX byte 1, bits [3:0]—mmmm)—its content encodes an implied leading opcode byte (0F, 0F 38, or 0F 3). Data element width field 2264 (EVEX byte 2, bit [7]—W)—is represented by the notation EVEX.W. EVEX.W is used to define the granularity (size) of the datatype (either 32-bit data elements or 64-bit data elements). EVEX.vvvv 2320 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2320 encodes the 4 low-order bits of the first source register specifier stored in inverted (1s complement) form. Depending on the instruction, an extra different EVEX bit field is used to extend the specifier size to 32 registers. EVEX.U 2268 Class field (EVEX byte 2, bit [2]—U)—If EVEX.U=0, it indicates class A or EVEX.U0; if EVEX.U=1, it indicates class B or EVEX.U1.

Prefix encoding field 2325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2252 (EVEX byte 3, bit [7]—EH; also known as EVEX.EH, EVEX.rs, EVEX.RL, EVEX.write mask control, and EVEX.N; also illustrated with α)—as previously described, this field is context specific. Beta field 2254 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 2210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.$_{vvvv}$.

Write mask field 2270 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2330 (Byte 4) is also known as the opcode byte. Part of the opcode is specified in this field. MOD R/M Field 2340 (Byte 5) includes MOD field 2342, Reg field 2344, and R/M field 2346. As previously described, the MOD field's 2342 content distinguishes between memory access and non-memory access operations. The role of Reg field 2344 can be summarized to two situations: encoding either the destination register operand or a source register operand, or be treated as an opcode extension and not used to encode any instruction operand. The role of R/M field 2346 may include the following: encoding the instruction operand that references a memory address, or encoding either the destination register operand or a source register operand.

Scale, Index, Base (SIB) Byte (Byte 6)—As previously described, the scale field's 2250 content is used for memory address generation. SIB.xxx 2354 and SIB.bbb 2356—the contents of these fields have been previously referred to with regard to the register indexes Xxxx and Bbbb. Displacement field 2262A (Bytes 7-10)—when MOD field 2342 contains 10, bytes 7-10 are the displacement field 2262A, and it works the same as the legacy 32-bit displacement (disp32) and works at byte granularity.

Displacement factor field 2262B (Byte 7)—when MOD field 2342 contains 01, byte 7 is the displacement factor field 2262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2262B is a reinterpretation of disp8; when using displacement factor field 2262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2262B substitutes the legacy x86 instruction set 8-bit displacement. Thus, the displacement factor field 2262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset) Immediate field 2272 operates as previously described.

FIG. 11B is a block diagram illustrating the fields of the specific vector friendly instruction format 2300 that make up the full opcode field 2274 according to one embodiment of the invention. Specifically, the full opcode field 2274 includes the format field 2240, the base operation field 2242, and the data element width (W) field 2264. The base operation field 2242 includes the prefix encoding field 2325, the opcode map field 2315, and the real opcode field 2330.

FIG. 11C is a block diagram illustrating the fields of the specific vector friendly instruction format 2300 that make up the register index field 2244 according to one embodiment of the invention. Specifically, the register index field 2244 includes the REX field 2305, the REX' field 2310, the MODR/M.reg field 2344, the MODR/M.r/m field 2346, the VVVV field 2320, xxx field 2354, and the bbb field 2356.

Figure 11D:
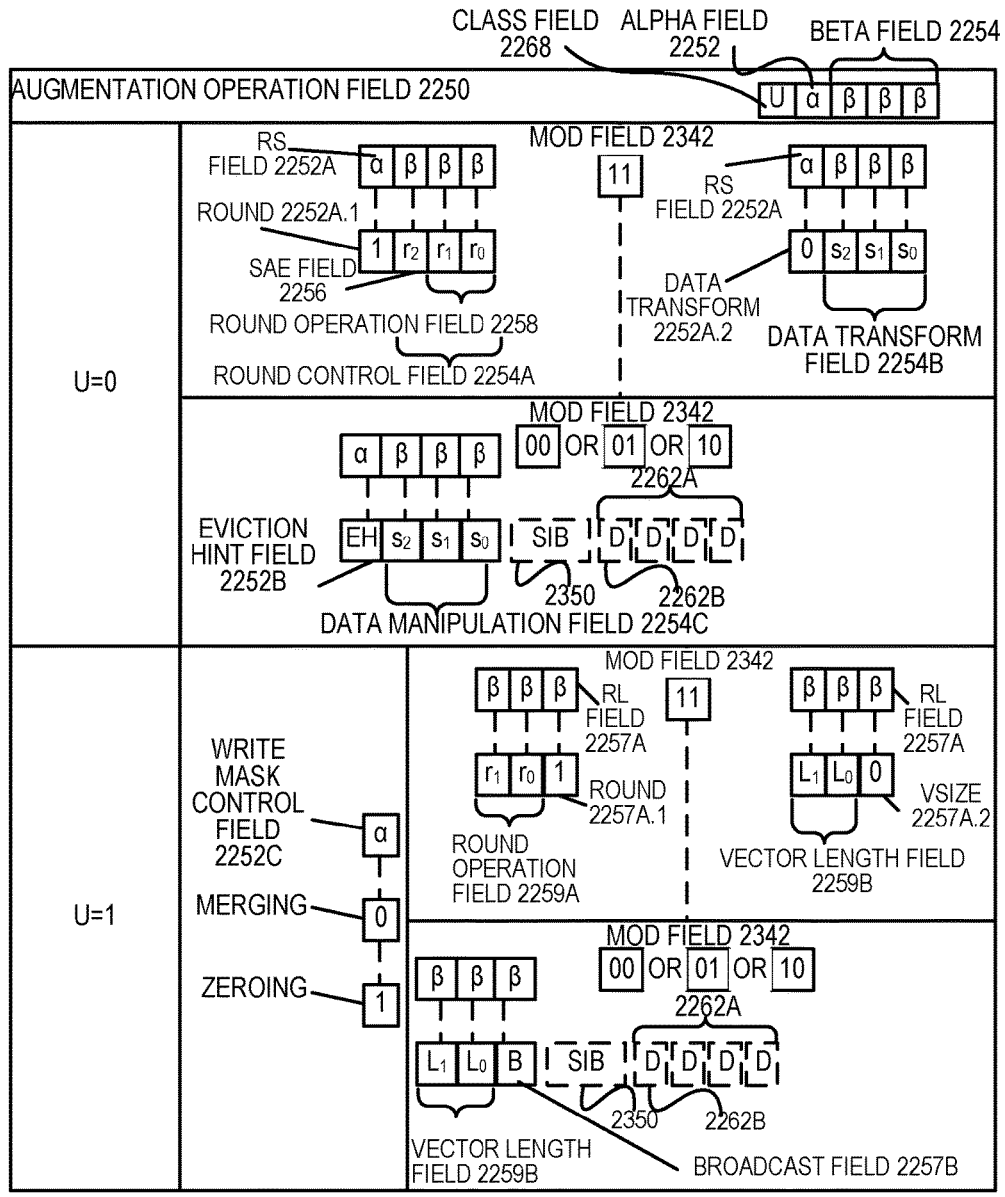
FIG. 11D is a block diagram illustrating a generic vector friendly instruction format according to another embodiment of the invention.

FIG. 11D is a block diagram illustrating the fields of the specific vector friendly instruction format 2300 that make up the augmentation operation field 2250 according to one embodiment of the invention. When the class (U) field 2268 contains 0, it signifies EVEX.U0 (class A 2268A); when it contains 1, it signifies EVEX.U1 (class B 2268B). When U=0 and the MOD field 2342 contains 11 (signifying a no memory access operation), the alpha field 2252 (EVEX byte 3, bit [7]—EH) is interpreted as the rs field 2252A. When the rs field 2252A contains a 1 (round 2252A.1), the beta field 2254 (EVEX byte 3, bits [6:4]—SSS) is interpreted as the round control field 2254A. The round control field 2254A includes a one bit SAE field 2256 and a two bit round operation field 2258. When the rs field 2252A contains a 0 (data transform 2252A.2), the beta field 2254 (EVEX byte 3, bits [6:4]—SSS) is interpreted as a three bit data transform field 2254B. When U=0 and the MOD field 2342 contains 00, 01, or 10 (signifying a memory access operation), the alpha field 2252 (EVEX byte 3, bit [7]—EH) is interpreted as the eviction hint (EH) field 2252B and the beta field 2254 (EVEX byte 3, bits [6:4]—SSS) is interpreted as a three bit data manipulation field 2254C.

When U=1, the alpha field 2252 (EVEX byte 3, bit [7]—EH) is interpreted as the write mask control (Z) field 2252C. When U=1 and the MOD field 2342 contains 11 (signifying a no memory access operation), part of the beta field 2254 (EVEX byte 3, bit [4]—$S_0$) is interpreted as the RL field 2257A; when it contains a 1 (round 2257A.1) the rest of the beta field 2254 (EVEX byte 3, bit [6-5]—$S_{2-1}$) is interpreted as the round operation field 2259A, while when the RL field 2257A contains a 0 (VSIZE 2257.A2) the rest of the beta field 2254 (EVEX byte 3, bit [6-5]—$S_{2-1}$) is interpreted as the vector length field 2259B (EVEX byte 3, bit [6-5]—$L1_{1-0}$). When U=1 and the MOD field 2342 contains 00, 01, or 10 (signifying a memory access operation), the beta field 2254 (EVEX byte 3, bits [6:4]—SSS) is interpreted as the vector length field 2259B (EVEX byte 3, bit [6-5]—$L_{1-0}$) and the broadcast field 2257B (EVEX byte 3, bit [4]—B).

Figure 12:
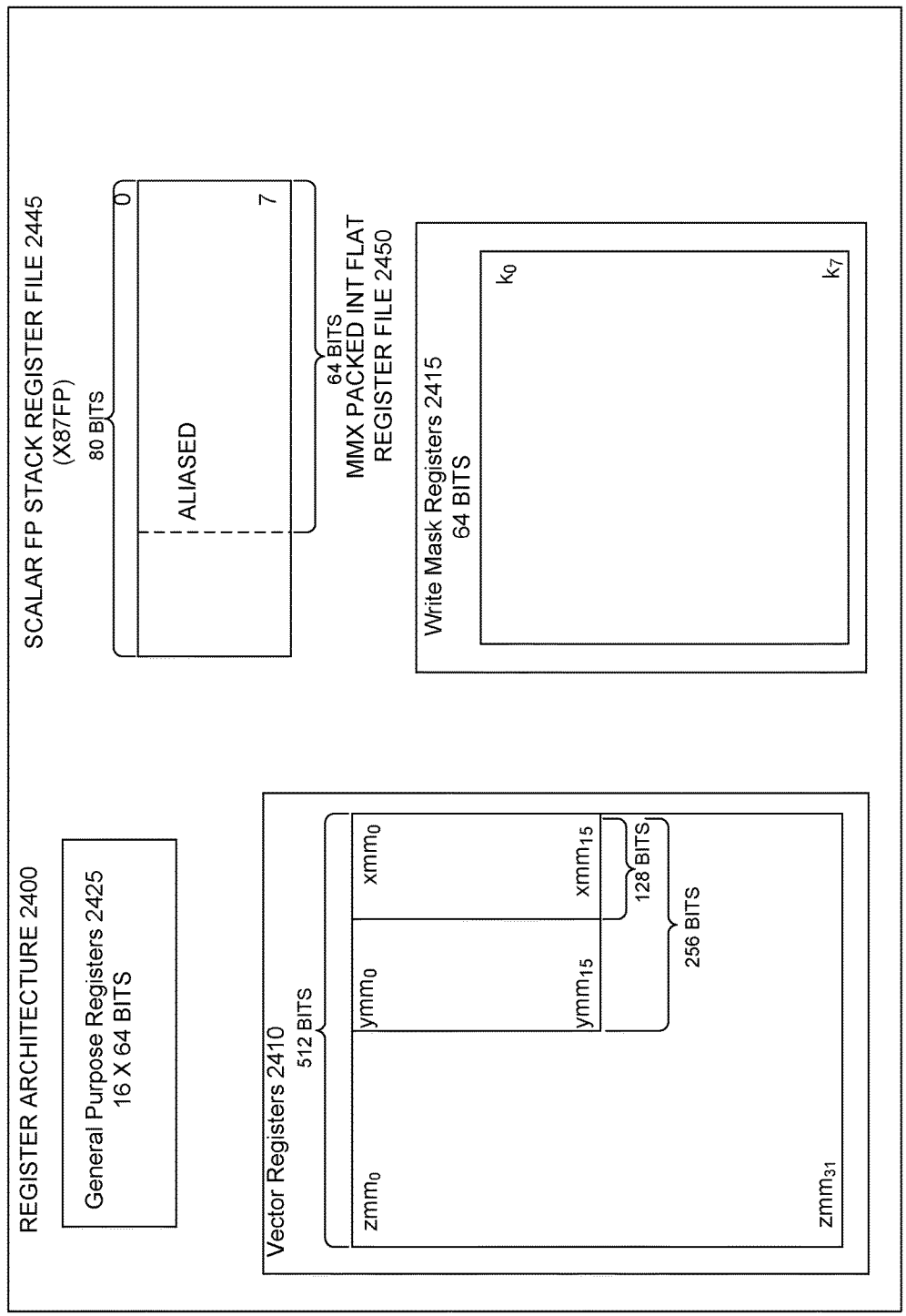
FIG. 12 is a block diagram of register architecture according to one embodiment of the invention.

FIG. 12 is a block diagram of a register architecture 2400 according to one embodiment of the invention. In the embodiment illustrated, there are 32 vector registers 2410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2300 operates on these overlaid register file as illustrated in the below tables.

| Adjustable Vector Length | Class | Operations | Registers |
|---|---|---|---|
| Instruction Templates that do not include the vector length field 2259B | A (FIG. 10A; U = 0) | 2210, 2215, 2225, 2230 | zmm registers (the vector length is 64 byte) |
| | B (FIG. 10B; U = 1) | 2212 | zmm registers (the vector length is 64 byte) |
| Instruction Templates that do include the vector length field 2259B | B (FIG. 10B; U = 1) | 2217, 2227 | zmm, ymm, or xmm registers (the vector length is 64 byte, 32 byte, or 16 byte) depending on the vector length field 2259B |

In other words, the vector length field 2259B selects between a maximum length and one or more other shorter lengths, where each such shorter length is half the length of the preceding length; and instructions templates without the vector length field 2259B operate on the maximum vector length. Further, in one embodiment, the class B instruction templates of the specific vector friendly instruction format 2300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2415—in the embodiment illustrated, there are 8 write mask registers (k0 through k7), each 64 bits in size. In an alternate embodiment, the write mask registers 2415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 2425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2445, on which is aliased the MMX packed integer flat register file 2450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 2500 includes a fetch stage 2502, a length decode stage 2504, a decode stage 2506, an allocation stage 2508, a renaming stage 2510, a scheduling (also known as a dispatch or issue) stage 2512, a register read/memory read stage 2514, an execute stage 2516, a write back/memory write stage 2518, an exception handling stage 2522, and a commit stage 2524.

FIG. 13B shows processor core 2590 including a front end unit 2530 coupled to an execution engine unit 2550, and both are coupled to a memory unit 2570. The core 2590 may be a reduced instruction set computing (RISC) core, a complex instruction set computing (CISC) core, a very long instruction word (VLIW) core, or a hybrid or alternative core type. As yet another option, the core 2590 may be a special-purpose core, such as, for example, a network or communication core, compression engine, coprocessor core, general purpose computing graphics processing unit (GPGPU) core, graphics core, or the like.

The front end unit 2530 includes a branch prediction unit 2532 coupled to an instruction cache unit 2534, which is coupled to an instruction translation lookaside buffer (TLB) 2536, which is coupled to an instruction fetch unit 2538, which is coupled to a decode unit 2540. The decode unit 2540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2590 includes a microcode ROM or other medium that stores microcode for certain macroinstructions (e.g., in decode unit 2540 or otherwise within the front end unit 2530). The decode unit 2540 is coupled to a rename/allocator unit 2552 in the execution engine unit 2550.

The execution engine unit 2550 includes the rename/allocator unit 2552 coupled to a retirement unit 2554 and a set of one or more scheduler unit(s) 2556. The scheduler unit(s) 2556 represents any number of different schedulers, including reservations stations, central instruction window, etc. The scheduler unit(s) 2556 is coupled to the physical register file(s) unit(s) 2558. Each of the physical register file(s) units 2558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc.

In one embodiment, the physical register file(s) unit 2558 comprises a vector registers unit, a write mask registers unit, and a scalar registers unit. These register units may provide architectural vector registers, vector mask registers, and general purpose registers. The physical register file(s) unit(s) 2558 is overlapped by the retirement unit 2554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2554 and the physical register file(s) unit(s) 2558 are coupled to the execution cluster(s) 2560.

The execution cluster(s) 2560 includes a set of one or more execution units 2562 and a set of one or more memory access units 2564. The execution units 2562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 2556, physical register file(s) unit(s) 2558, and execution cluster(s) 2560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2564). It should also be understood that where separate pipelines are used, one or more of these pipelines may be out-of-order issue/execution and the rest in-order.

The set of memory access units 2564 is coupled to the memory unit 2570, which includes a data TLB unit 2572 coupled to a data cache unit 2574 coupled to a level 2 (L2) cache unit 2576. In one exemplary embodiment, the memory access units 2564 may include a load unit, a store address unit, and a store data unit, each of which is coupled to the data TLB unit 2572 in the memory unit 2570. The instruction cache unit 2534 is further coupled to a level 2 (L2) cache unit 2576 in the memory unit 2570. The L2 cache unit 2576 is coupled to one or more other levels of cache and eventually to a main memory.

By way of example, the exemplary register renaming, out-of-order issue/execution core architecture may implement the pipeline 2500 as follows: 1) the instruction fetch 2538 performs the fetch and length decoding stages 2502 and 2504; 2) the decode unit 2540 performs the decode stage 2506; 3) the rename/allocator unit 2552 performs the allocation stage 2508 and renaming stage 2510; 4) the scheduler unit(s) 2556 performs the schedule stage 2512; 5) the physical register file(s) unit(s) 2558 and the memory unit 2570 perform the register read/memory read stage 2514; the execution cluster 2560 perform the execute stage 2516; 6) the memory unit 2570 and the physical register file(s) unit(s) 2558 perform the write back/memory write stage 2518; 7) various units may be involved in the exception handling stage 2522; and 8) the retirement unit 2554 and the physical register file(s) unit(s) 2558 perform the commit stage 2524.

The core 2590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2590 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2534/2574 and a shared L2 cache unit 2576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14B:
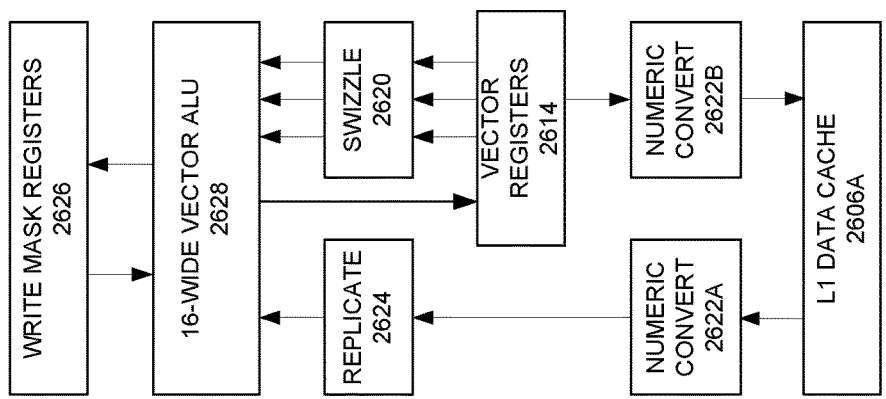
FIG. 14B is a block diagram of a processor core according to another embodiment of the invention.
Figure 14A:
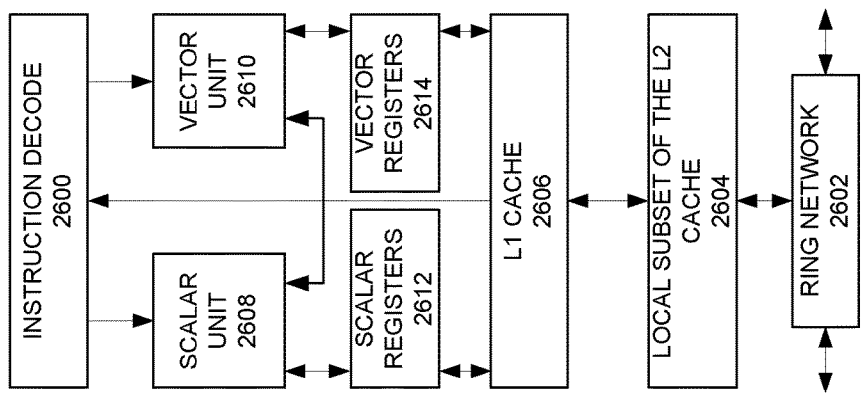
FIG. 14A is a block diagram of a processor core according to one embodiment of the invention.

FIG. 14A and FIG. 14B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 2602 and with its local subset of the Level 2 (L2) cache 2604, according to embodiments of the invention. In one embodiment, an instruction decoder 2600 supports the x86 instruction set with a packed data instruction set extension. An L1 cache 2606 allows low-latency accesses to cache memory into the scalar and vector units. While in one embodiment (to simplify the design), a scalar unit 2608 and a vector unit 2610 use separate register sets (respectively, scalar registers 2612 and vector registers 2614) and data transferred between them is written to memory and then read back in from a level 1 (L1) cache 2606, alternative embodiments of the invention may use a different approach (e.g., use a single register set or include a communication path that allow data to be transferred between the two register files without being written and read back).

The local subset of the L2 cache 2604 is part of a global L2 cache that is divided into separate local subsets, one per processor core. Each processor core has a direct access path to its own local subset of the L2 cache 2604. Data read by a processor core is stored in its L2 cache subset 2604 and can be accessed quickly, in parallel with other processor cores accessing their own local L2 cache subsets. Data written by a processor core is stored in its own L2 cache subset 2604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 2606A part of the L1 cache 2604, as well as more detail regarding the vector unit 2610 and the vector registers 2614. Specifically, the vector unit 2610 is a 16-wide vector processing unit (VPU) (see the 16-wide ALU 2628), which executes one or more of integer, single-precision float, and double-precision float instructions. The VPU supports swizzling the register inputs with swizzle unit 2620, numeric conversion with numeric convert units 2622A-B, and replication with replication unit 2624 on the memory input. Write mask registers 2626 allow predicating resulting vector writes.

Figure 15:
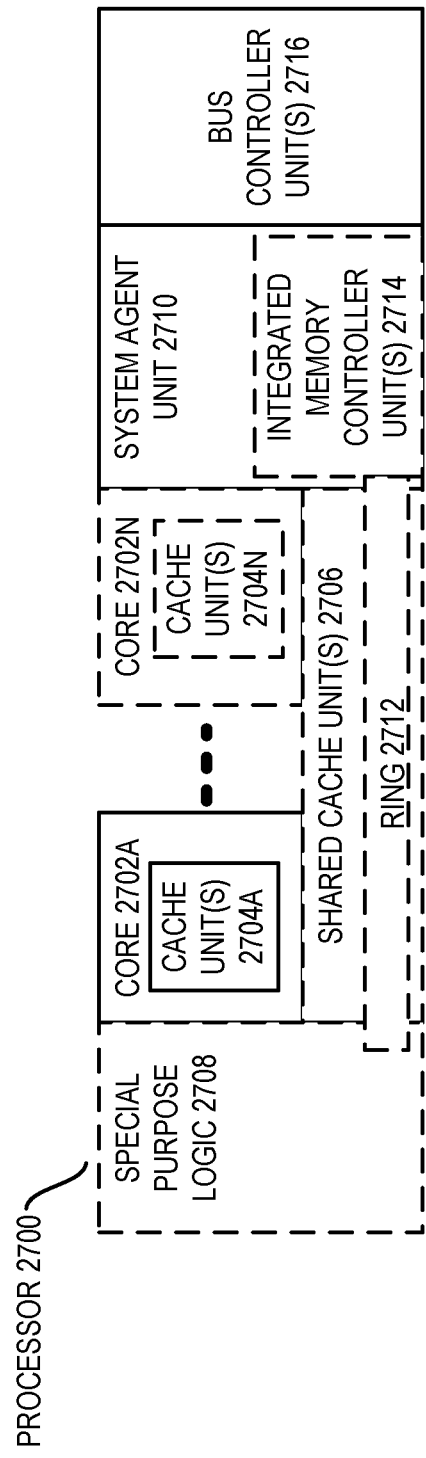
FIG. 15 is a block diagram of a processor according to embodiments of the invention.

FIG. 15 is a block diagram of a processor 2700 that may have more than one core, may have an integrated memory controller, and may have integrated graphics according to embodiments of the invention. The solid lined boxes in FIG. 15 illustrate a processor 2700 with a single core 2702A, a system agent 2710, a set of one or more bus controller units 2716, while the optional addition of the dashed lined boxes illustrates an alternative processor 2700 with multiple cores 2702A-N, a set of one or more integrated memory controller unit(s) 2714 in the system agent unit 2710, and special purpose logic 2708.

Thus, different implementations of the processor 2700 may include: 1) a CPU with the special purpose logic 2708 being integrated graphics and/or scientific (throughput) logic (which may include one or more cores), and the cores 2702A-N being one or more general purpose cores (e.g., general purpose in-order cores, general purpose out-of-order cores, a combination of the two); 2) a coprocessor with the cores 2702A-N being a large number of special purpose cores intended primarily for graphics and/or scientific (throughput); and 3) a coprocessor with the cores 2702A-N being a large number of general purpose in-order cores. Thus, the processor 2700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2706, and external memory (not shown) coupled to the set of integrated memory controller units 2714. The set of shared cache units 2706 may include one or more mid-level caches, such as level 2 (L2), level 3 (L3), level 4 (L4), or other levels of cache, a last level cache (LLC), and/or combinations thereof. While in one embodiment a ring based interconnect unit 2712 interconnects the integrated graphics logic 2708, the set of shared cache units 2706, and the system agent unit 2710/integrated memory controller unit(s) 2714, alternative embodiments may use any number of well-known techniques for interconnecting such units. In one embodiment, coherency is maintained between one or more cache units 2706 and cores 2702-A-N.

In some embodiments, one or more of the cores 2702A-N are capable of multi-threading. The system agent 2710 includes those components coordinating and operating cores 2702A-N. The system agent unit 2710 may include for example a power control unit (PCU) and a display unit. The PCU may be or include logic and components needed for regulating the power state of the cores 2702A-N and the integrated graphics logic 2708. The display unit is for driving one or more externally connected displays.

The cores 2702A-N may be homogenous or heterogeneous in terms of architecture instruction set; that is, two or more of the cores 2702A-N may be capable of execution the same instruction set, while others may be capable of executing only a subset of that instruction set or a different instruction set.

FIG. 16 to FIG. 20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
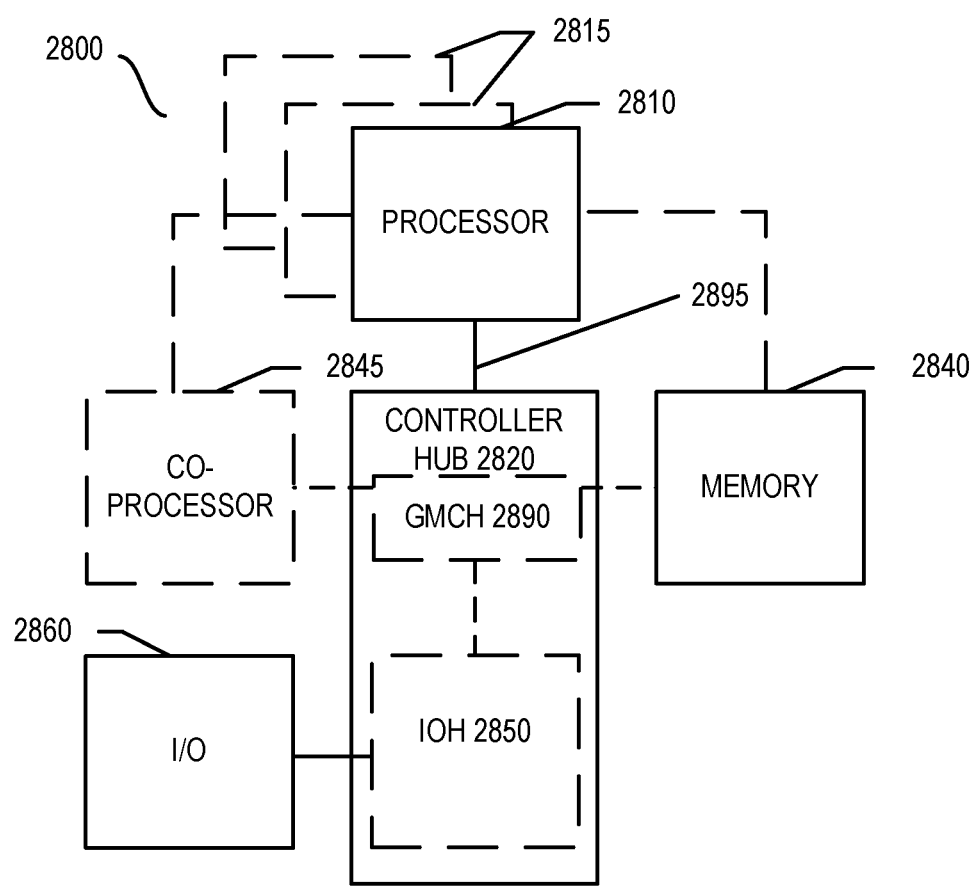
FIG. 16 is a block diagram of a system in accordance with one embodiment of the invention.

Referring now to FIG. 16, shown is a block diagram of a system 2800 in accordance with one embodiment of the present invention. The system 2800 may include one or more processors 2810, 2815, which are coupled to a controller hub 2820. In one embodiment the controller hub 2820 includes a graphics memory controller hub (GMCH) 2890 and an Input/Output Hub (IOH) 2850 (which may be on separate chips); the GMCH 2890 includes memory and graphics controllers to which are coupled memory 2840 and a coprocessor 2845; the IOH 2850 is couples input/output (I/O) devices 2860 to the GMCH 2890. Alternatively, one or both of the memory and graphics controllers are integrated within the processor (as described herein), the memory 2840 and the coprocessor 2845 are coupled directly to the processor 2810, and the controller hub 2820 in a single chip with the IOH 2850.

The optional nature of additional processors 2815 is denoted in FIG. 16 with broken lines. Each processor 2810, 2815 may include one or more of the processing cores described herein and may be some version of the processor 2700.

The memory 2840 may be, for example, dynamic random access memory (DRAM), phase change memory (PCM), or a combination of the two. For at least one embodiment, the controller hub 2820 communicates with the processor(s) 2810, 2815 via a multi-drop bus, such as a frontside bus (FSB), point-to-point interface such as QuickPath Interconnect (QPI), or similar connection 2895.

In one embodiment, the coprocessor 2845 is a special-purpose processor, such as, for example, a high-throughput MIC processor, a network or communication processor, compression engine, graphics processor, GPGPU, embedded processor, or the like. In one embodiment, controller hub 2820 may include an integrated graphics accelerator.

There can be a variety of differences between the physical resources 2810, 2815 in terms of a spectrum of metrics of merit including architectural, microarchitectural, thermal, power consumption characteristics, and the like.

In one embodiment, the processor 2810 executes instructions that control data processing operations of a general type. Embedded within the instructions may be coprocessor instructions. The processor 2810 recognizes these coprocessor instructions as being of a type that should be executed by the attached coprocessor 2845. Accordingly, the processor 2810 issues these coprocessor instructions (or control signals representing coprocessor instructions) on a coprocessor bus or other interconnect, to coprocessor 2845. Coprocjessor(s) 2845 accept and execute the received coprocessor instructions.

Figure 17:
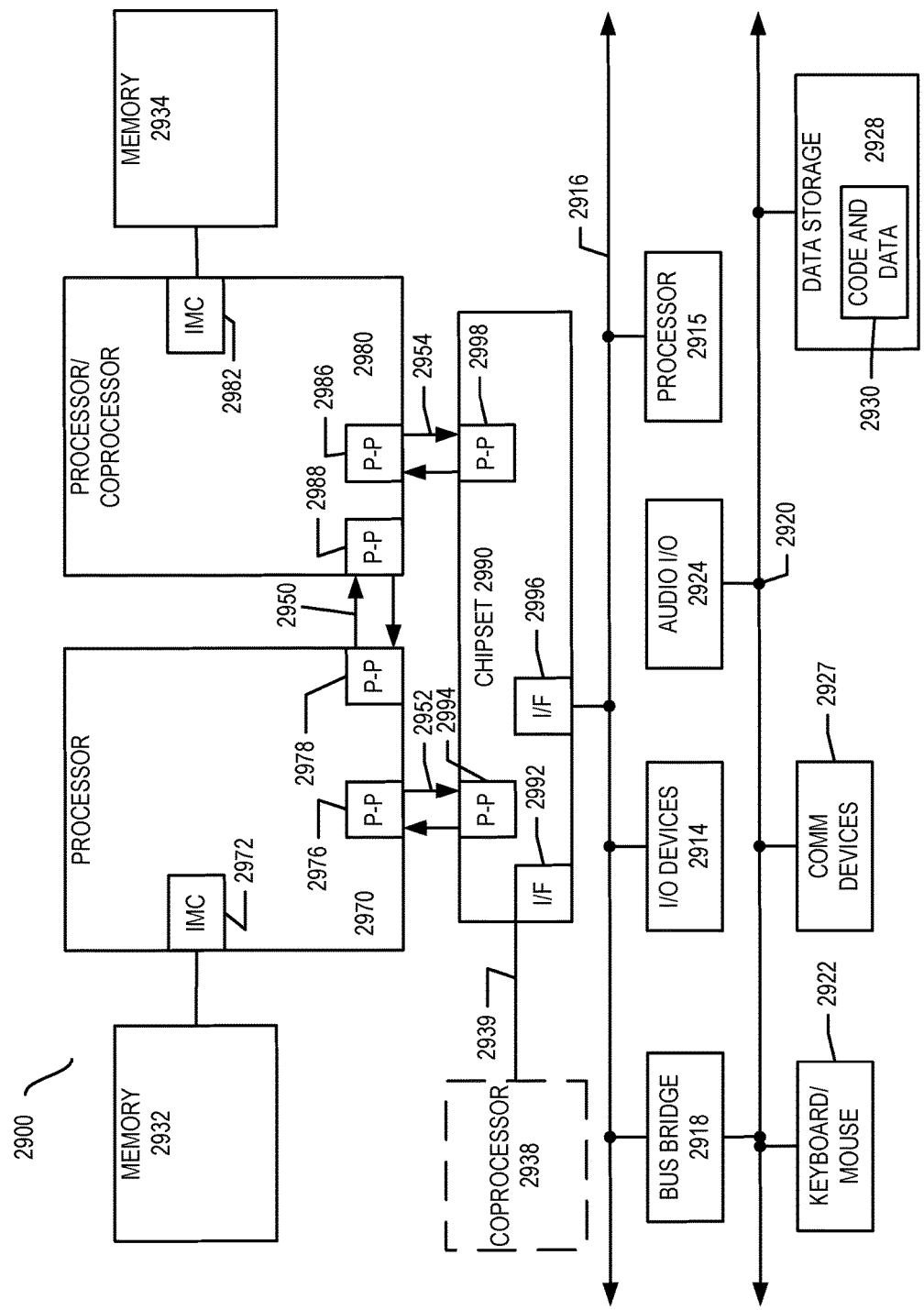
FIG. 17 is a block diagram of a more specific exemplary system in accordance with an embodiment of the invention.

Referring now to FIG. 17, shown is a block diagram of a first more specific exemplary system 2900 in accordance with an embodiment of the present invention. As shown in FIG. 17, multiprocessor system 2900 is a point-to-point interconnect system, and includes a first processor 2970 and a second processor 2980 coupled via a point-to-point interconnect 2950. Each of processors 2970 and 2980 may be some version of the processor 2700. In one embodiment of the invention, processors 2970 and 2980 are respectively processors 2810 and 2815, while coprocessor 2938 is coprocessor 2845. In another embodiment, processors 2970 and 2980 are respectively processor 2810 coprocessor 2845.

Processors 2970 and 2980 are shown including integrated memory controller (IMC) units 2972 and 2982, respectively. Processor 2970 also includes as part of its bus controller units point-to-point (P-P) interfaces 2976 and 2978; similarly, second processor 2980 includes P-P interfaces 2986 and 2988. Processors 2970, 2980 may exchange information via a point-to-point (P-P) interface 2950 using P-P interface circuits 2978, 2988. As shown in FIG. 17, IMCs 2972 and 2982 couple the processors to respective memories, namely a memory 2932 and a memory 2934, which may be portions of main memory locally attached to the respective processors.

Processors 2970, 2980 may each exchange information with a chipset 2990 via individual P-P interfaces 2952, 2954 using point to point interface circuits 2976, 2994, 2986, 2998. Chipset 2990 may optionally exchange information with the coprocessor 2938 via a high-performance interface 2939. In one embodiment, the coprocessor 2938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode. Chipset 2990 may be coupled to a first bus 2916 via an interface 2996. In one embodiment, first bus 2916 may be a Peripheral Component Interconnect (PCI) bus, or a bus such as a PCI Express bus or another third generation I/O interconnect bus, although the scope of the present invention is not so limited.

As shown in FIG. 17, various I/O devices 2914 may be coupled to first bus 2916, along with a bus bridge 2918 which couples first bus 2916 to a second bus 2920. In one embodiment, one or more additional processor(s) 2915, such as coprocessors, high-throughput MIC processors, GPGPU's, accelerators (such as, e.g., graphics accelerators or digital signal processing (DSP) units), field programmable gate arrays, or any other processor, are coupled to first bus 2916. In one embodiment, second bus 2920 may be a low pin count (LPC) bus. Various devices may be coupled to a second bus 2920 including, for example, a keyboard and/or mouse 2922, communication devices 2927 and a storage unit 2928 such as a disk drive or other mass storage device which may include instructions/code and data 2930, in one embodiment. Further, an audio I/O 2924 may be coupled to the second bus 2920. Note that other architectures are possible. For example, instead of the point-to-point architecture of FIG. 17, a system may implement a multi-drop bus or other such architecture.

Figure 18:
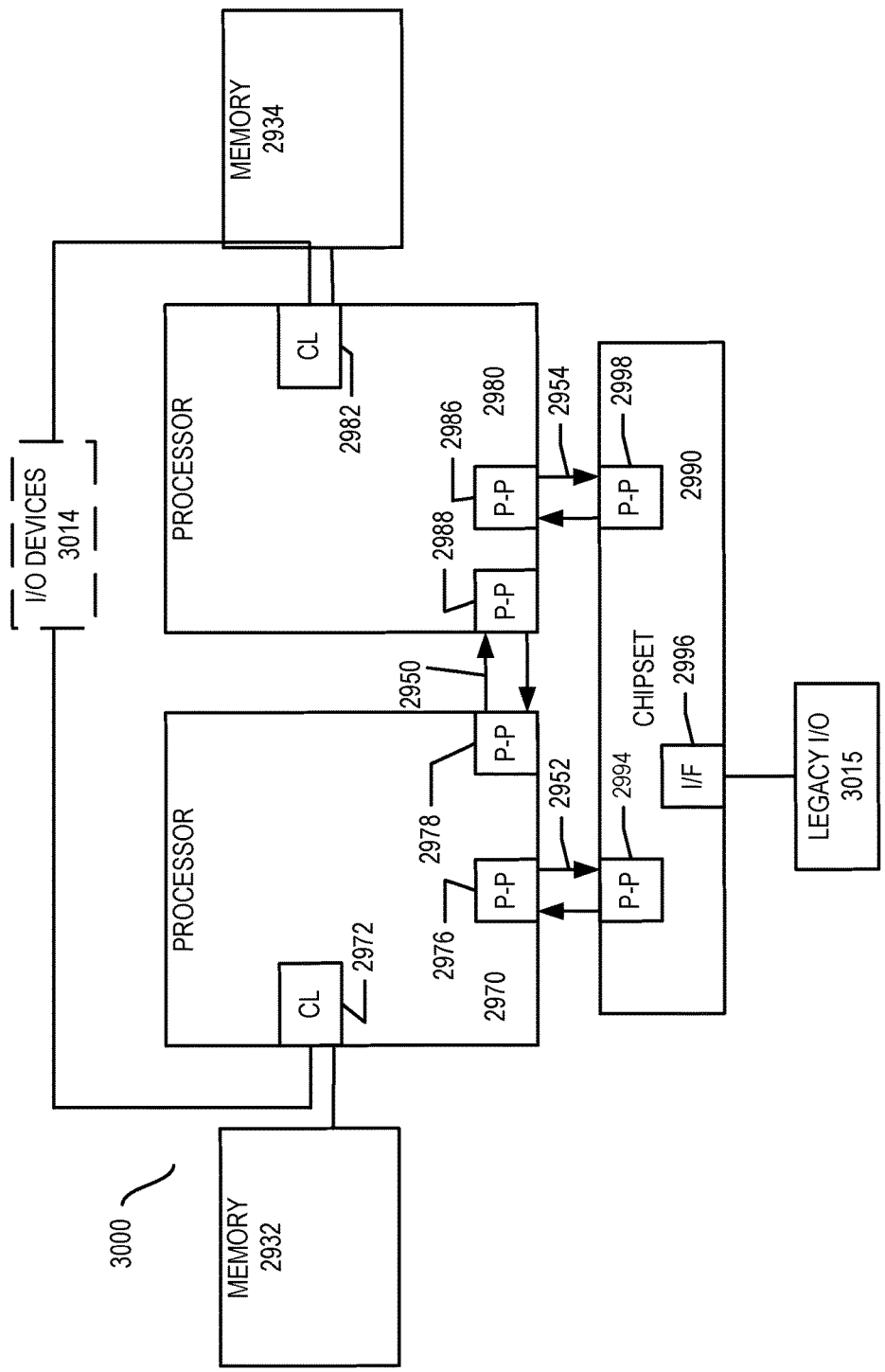
FIG. 18 is a block diagram of a more specific exemplary system in accordance with another embodiment of the invention.

Referring now to FIG. 18, shown is a block diagram of a second more specific exemplary system 3000 in accordance with an embodiment of the present invention. Like elements in FIG. 18 and FIG. 19 bear like reference numerals, and certain aspects of FIG. 17 have been omitted from FIG. 18 in order to avoid obscuring other aspects of FIG. 18. FIG. 18 illustrates that the processors 2970, 2980 may include integrated memory and I/O control logic ("CL") 2972 and 2982, respectively. Thus, the CL 2972, 2982 include integrated memory controller units and include I/O control logic. FIG. 18 illustrates that not only are the memories 2932, 2934 coupled to the CL 2972, 2982, but also that I/O devices 3014 are also coupled to the control logic 2972, 2982. Legacy I/O devices 3015 are coupled to the chipset 2990.

Figure 19:
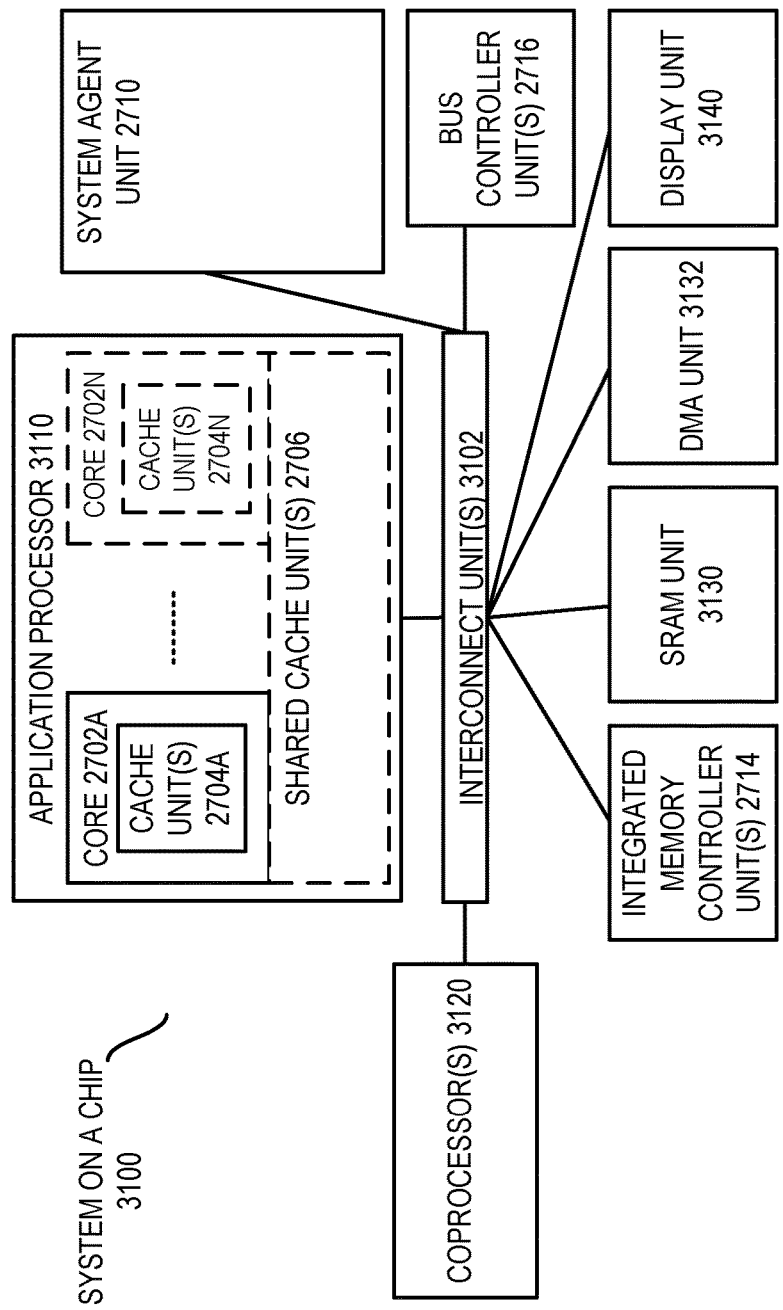
FIG. 19 is a block diagram of a SoC in accordance with an embodiment of the invention.

Referring now to FIG. 19, shown is a block diagram of a SoC 3100 in accordance with an embodiment of the present invention. Similar elements in FIG. 15 bear like reference numerals. Also, dashed lined boxes are optional features on more advanced SoCs. In FIG. 19, an interconnect unit(s) 3102 is coupled to: an application processor 3110 which includes a set of one or more cores 202A-N and shared cache unit(s) 2706; a system agent unit 2710; a bus controller unit(s) 2716; an integrated memory controller unit(s) 2714; a set or one or more coprocessors 3120 which may include integrated graphics logic, an image processor, an audio processor, and a video processor; an static random access memory (SRAM) unit 3130; a direct memory access (DMA) unit 3132; and a display unit 3140 for coupling to one or more external displays. In one embodiment, the coprocessor(s) 3120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2930 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
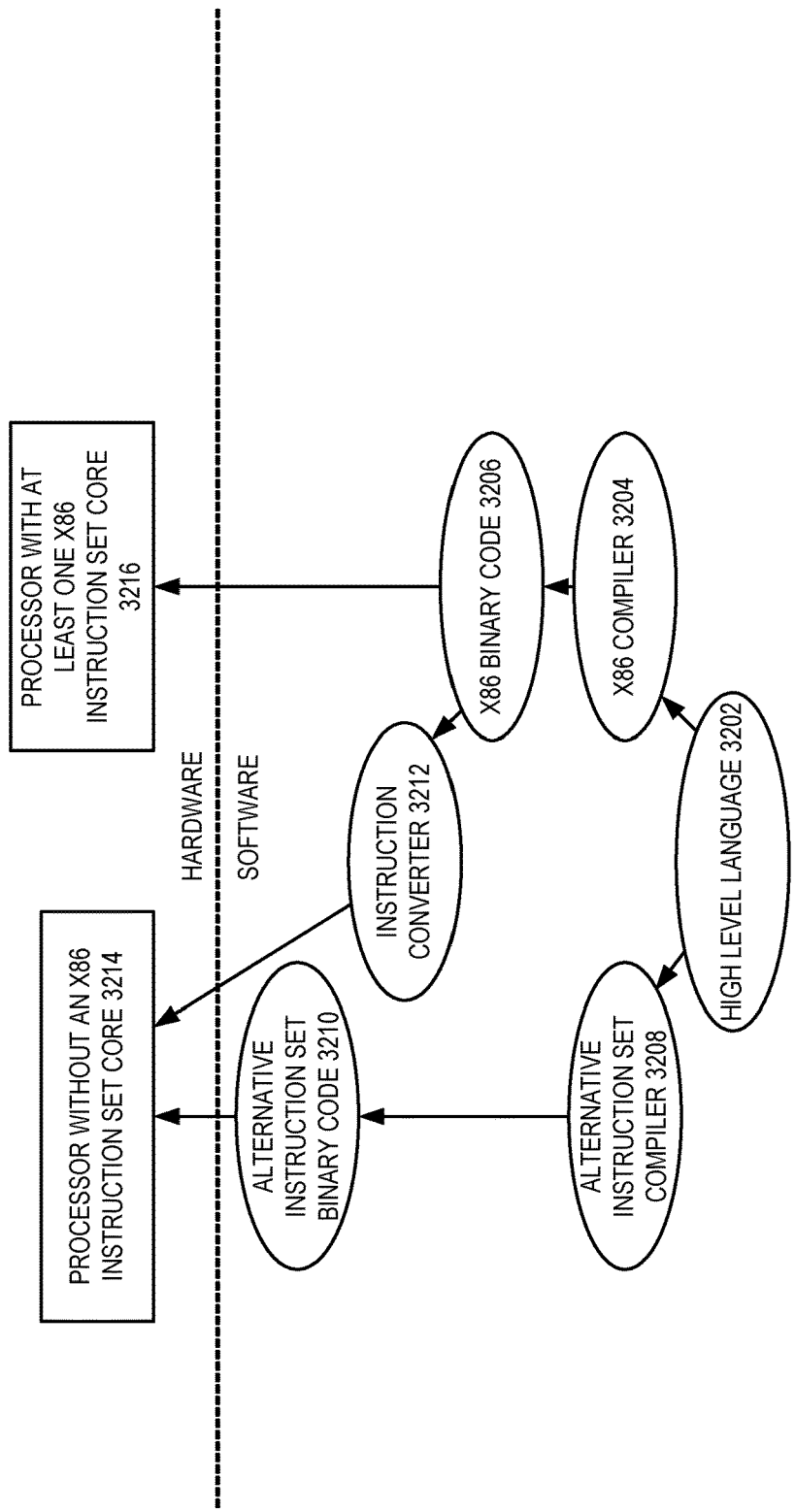
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 3202 may be compiled using an x86 compiler 3204 to generate x86 binary code 3206 that may be natively executed by a processor with at least one x86 instruction set core 3216. The processor with at least one x86 instruction set core 3216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3204 represents a compiler that is operable to generate x86 binary code 3206 (e.g., object code) that can, with or without additional linkage processing, be executed on the processor with at least one x86 instruction set core 3216. Similarly, FIG. 20 shows the program in the high level language 3202 may be compiled using an alternative instruction set compiler 3208 to generate alternative instruction set binary code 3210 that may be natively executed by a processor without at least one x86 instruction set core 3214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3212 is used to convert the x86 binary code 3206 into code that may be natively executed by the processor without an x86 instruction set core 3214. This converted code is not likely to be the same as the alternative instruction set binary code 3210 because an instruction converter capable of this is difficult to make; however, the converted code will accomplish the general operation and be made up of instructions from the alternative instruction set. Thus, the instruction converter 3212 represents software, firmware, hardware, or a combination thereof that, through emulation, simulation or any other process, allows a processor or other electronic device that does not have an x86 instruction set processor or core to execute the x86 binary code 3206.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   an instruction decoder to receive a first instruction to process a secure hash algorithm 2(SHA-2) hash algorithm, the first instruction having fields to identify a first operand associated with a first storage location to store a SHA-2 state and a second operand associated with a second storage location to store a plurality of messages and round constants; and
   an execution unit coupled to the instruction decoder to perform one or more iterations of the SHA-2 hash algorithm on the SHA-2 state specified by the first operand and the plurality of messages and round constants specified by the second operand, in response to the first instruction,
   wherein the instruction decoder is to receive a second instruction, and wherein in response to the second instruction, the execution unit is configured to perform a first part of message scheduling operations based on a plurality of first previous messages specified by the second instruction and to generate an intermediate result, and
   wherein the second instruction includes a third operand, a fourth operand, and a fifth operand, wherein for a current iteration i of SHA-2 round operations, the third operand specifies a location to store messages w(i−13), w(i−14), w(i−15), and w(i−16), wherein the fourth operand specifies a location to store messages w(i−9), w(i−10), w(i−11), and w(i−12), and wherein the intermediate result is stored in a location specified by the fifth operand.

2. The processor of claim 1, wherein the first operand specifies a first register having at least 256 bits to store SHA-2 state variables used to perform SHA-256 round operations.

3. The processor of claim 2, wherein the second operand specifies a second register or a memory location having at least 64 bits to store at least two messages and round constants for the SHA-256 round operations.

4. The processor of claim 1, wherein the first operand specifies a first register having at least 512 bits to store SHA-2 state variables used to perform SHA-512 round operations.

5. The processor of claim 1, wherein the intermediate result comprises w(i−3)+s0(w(i−12)), w(i−14)+s0(w(i−13)), w(i−15)+s0(w(i−14)), w(i−16)+s0(w(i−15)), and wherein function s0(x) is represented by s0(x)=(x ROTR 7)XOR(x ROTR 18)XOR(x ROTR 3).

6. The processor of claim 1, wherein the instruction decoder receives a third instruction, and wherein in response to the third instruction, the execution unit is configured to perform a second part of the message scheduling operations on second previous messages and the intermediate result specified in the third instruction and to generate next input messages for one or more rounds operations of the SHA-2 algorithm to be performed during a next iteration of one or more rounds of the SHA-2 algorithm.

7. The processor of claim 6, wherein the third instruction includes a sixth operand, a seventh operand, and an eighth operand, wherein for a current iteration i of SHA-2round operations, the sixth operand specifies a register to store message w(i−5), w(i−6), w(i−7), and w(i−8), wherein the seventh operand specifies a register to store messages w(i−1), w(i−2), w(i−3), and w(i−4), and wherein the next input messages comprise w(i), w (i+1), w(i+2), and w(i+3) to be stored in a register specified by the eighth operand.

8. A method, comprising:
receiving, at an instruction decoder, a first instruction to process a secure hash algorithm 2 (SHA-2) hash algorithm, the first instruction having fields to identify a first operand associated with a first storage location to store a SHA-2 state and a second operand associated with a second storage location to store a plurality of messages and round constants;
performing, by an execution unit coupled to the instruction decoder, one or more iterations of the SHA-2 hash algorithm on the SHA-2 state specified by the first operand and the plurality of messages and round constants specified by the second operand, in response to the first instruction; and
receiving, at the instruction decoder, a second instruction, and wherein in response to the second instruction, the execution unit performing a first part of message scheduling operations based on a plurality of first previous messages specified by the second instruction and to generate an intermediate result,
wherein the second instruction includes a third operand, a fourth operand, and a fifth operand, wherein for a current iteration i of SHA-2 round operations, the third operand specifies a location to store messages w(i−13), w(i−14), w(i−15), and w(i−16), wherein the fourth operand specifies a location to store messages w(i−9), w(i−10), w(i−11), and w(i−12), and wherein the intermediate result is stored in a location specified by the fifth operand.

9. The method of claim 8, wherein the first operand specifies a first register having at least 256 bits to store SHA-2 state variables used to perform SHA-256 round operations.

10. The method of claim 9, wherein the second operand specifies a second register or a memory location having at least 64 bits to store at least two messages and round constants for the SHA-256 round operations.

11. The method of claim 8, wherein the first operand specifies a first register having at least 512 bits to store SHA-2 state variables used to perform SHA-512 round operations.

12. The method of claim 8, wherein the intermediate result comprises w(i−3)+s0(w(i−12)), w(i−14)+s0(w(i−13)), w(i−15)+s0(w(i−14)), w(i−16)+s0(w(i−15)), and wherein function s0(x) is represented by s0(x) =(x ROTR 7)XOR(x ROTR 18)XOR(x ROTR 3).

13. The method of claim 8, wherein the instruction decoder receives a third instruction, and wherein in response to the third instruction, the execution unit is configured to perform a second part of the message scheduling operations on second previous messages and the intermediate result specified in the third instruction and to generate next input messages for one or more rounds operations of the SHA-2 algorithm to be performed during a next iteration of one or more rounds of the SHA-2 algorithm.

14. The method of claim 13, wherein the third instruction includes a sixth operand, a seventh operand, and an eighth operand, wherein for a current iteration i of SHA-2 round operations, the sixth operand specifies a register to store message w(i−5), w(i−6), w(i−7), and w(i−8), wherein the seventh operand specifies a register to store messages w(i−1), w(i−2), w(i−3), and w(i−4), and wherein the next input messages comprise w(i), w (i+1), w(i+2), and w(i+3) to be stored in a register specified by the eighth operand.

15. A system on a chip (SoC) comprising:
an integrated memory controller unit; and
a processor, the processor comprising:
a plurality of 64-bit general-purpose registers;
a plurality of 128-bit single instruction, multiple data (SIMD) registers;
a data cache;
an instruction cache;
a level 2 (L2) cache coupled to the data cache and coupled to the instruction cache;
a branch prediction unit;
an instruction translation lookaside buffer (TLB) coupled to the instruction cache;
an instruction fetch unit;
a decode unit coupled to the instruction fetch unit, the decode unit to decode instructions, including a Secure Hash Algorithm (SHA) 256 schedule instruction, the SHA 256 schedule instruction having a first field to specify a first 128-bit SIMD source register of the 128-bit SIMD registers, the first 128-bit SIMD source register to store a first operand that is to include a first 32-bit data element in bits [31:0], a second 32-bit data element in bits [63:32], a third 32-bit data element in bits [95:64], and a fourth 32-bit data element in bits [127:96], the SHA 256 schedule instruction having a second field to specify a second 128-bit SIMD source register of the 128-bit SIMD registers, the second 128-bit SIMD source register to store a second operand that is to include a fifth 32-bit data element in bits [31:0], a sixth 32-bit data element in bits [63:32], a seventh 32-bit data element in bits [95:64], and an eighth 32-bit data element in bits [127:96]; and an execution unit coupled to the decode unit, and coupled to the 128-bit SIMD registers, the execution unit to execute the SHA256 schedule instruction and to produce a result that is to include:
a first 32-bit result data element in bits [31:0] that is to be equal to a sum of a) the first 32-bit data element of the first operand and b) a value equal to the second 32-bit data element rotated right by seven bits, and exclusive-ORed with the second 32-bit data element rotated right by eighteen bits, and exclusive-ORed with the second 32-bit data element shifted right by three bits;
a second 32-bit result data element in bits [63:32] that is to be equal to a sum of a) the second 32-bit data element of the first operand and b) a value equal to the third 32-bit data element rotated right by seven bits, and exclusive-ORed with the third 32-bit data element rotated right by eighteen bits, and exclusive-ORed with the third 32-bit data element shifted right by three bits;
a third 32-bit result data element in bits [95:64] that is to be equal to a sum of a) the third 32-bit data element of the first operand and b) a value equal to the fourth 32-bit data element rotated right by seven bits, and exclusive-ORed with the fourth 32-bit data element rotated right by eighteen bits, and exclusive-ORed with the fourth 32-bit data element shifted right by three bits; and
a fourth 32-bit result data element in bits [127:96] that is to be equal to a sum of a) the fourth 32-bit data element of the first operand and b) a value equal to the fifth 32-bit data element rotated right by seven bits, and exclusive-ORed with the fifth 32-bit data element rotated right by eighteen bits, and exclusive-ORed with the fifth 32-bit data element shifted right by three bits.

16. The SoC of claim 15, wherein decode unit is to decode a second SHA 256 schedule instruction to be used to perform another part of SHA 256 scheduling.

17. The SoC of claim 15, wherein one of the first and second 128-bit SIMD source registers is also to be used as a destination to store the result.

18. The SoC of claim 15, wherein the processor is a reduced instruction set computing (RISC) processor.

19. The SoC of claim 15, wherein the processor further comprises a reorder buffer.

20. The SoC of claim 15, wherein the processor further comprises register renaming logic.

21. The SoC of claim 15, further comprising an image processor.

22. The SoC of claim 15, further comprising display logic to couple to one or more displays.

23. The SoC of claim 15, further comprising a communication device.

24. The SoC of claim 15, further comprising a graphics processing unit (GPU).

25. The SoC of claim 15, further comprising a network processor.

26. The SoC of claim 15, further comprising a direct memory access (DMA) unit.

27. The SoC of claim 15, further comprising a communication processor.

28. A system on a chip (SoC) comprising:
an integrated memory controller unit; and
a processor, the processor comprising:
a plurality of 64-bit general-purpose registers;
a plurality of 128-bit single instruction, multiple data (SIMD) registers;
a data cache;
an instruction cache;
a level 2 (L2) cache coupled to the data cache and coupled to the instruction cache;
a branch prediction unit;
an instruction translation lookaside buffer (TLB) coupled to the instruction cache;
an instruction fetch unit;
a decode means for decoding instructions, including a Secure Hash Algorithm (SHA) 256 schedule instruction, the SHA256 schedule instruction having a first field to specify a first 128-bit SIMD source register of the 128-bit SIMD registers, the first 128-bit SIMD source register to store a first operand that is to include a first 32-bit data element in bits [31:0], a second 32-bit data element in bits [63:32], a third 32-bit data element in bits [95:64], and a fourth 32-bit data element in bits [127:96], the SHA 256 schedule instruction having a second field to specify a second 128-bit SIMD source register of the 128-bit SIMD registers, the second 128-bit SIMD source register to store a second operand that is to include a fifth 32-bit data element in bits [31:0], a sixth 32-bit data element in bits [63:32], a seventh 32-bit data element in bits [95:64], and an eighth 32-bit data element in bits [127:96]; and
an execution means for executing the SHA 256 schedule instruction and producing a result that is to include:
a first 32-bit result data element in bits [31:0] that is to be equal to a sum of a) the first 32-bit data element of the first operand and b) a value equal to the second 32-bit data element rotated right by seven bits, and exclusive-ORed with the second 32-bit data element rotated right by eighteen bits, and exclusive-ORed with the second 32-bit data element shifted right by three bits;
a second 32-bit result data element in bits [63:32] that is to be equal to a sum of a) the second 32-bit data element of the first operand and b) a value equal to the third 32-bit data element rotated right by seven bits, and exclusive-ORed with the third 32-bit data element rotated right by eighteen bits, and exclusive-ORed with the third 32-bit data element shifted right by three bits;
a third 32-bit result data element in bits [95:64] that is to be equal to a sum of a) the third32-bit data element of the first operand and b) a value equal to the fourth 32-bit data element rotated right by seven bits, and exclusive-ORed with the fourth 32-bit data element rotated right by eighteen bits, and exclusive-ORed with the fourth 32-bit data element shifted right by three bits; and
a fourth 32-bit result data element in bits [127:96] that is to be equal to a sum of a) the fourth 32-bit data element of the first operand and b) a value equal to the fifth 32-bit data element rotated right by seven bits, and exclusive-ORed with the fifth 32-bit data element rotated right by eighteen bits, and exclusive-ORed with the fifth 32-bit data element shifted right by three bits.

29. A method comprising:
using an integrated memory controller unit to access a memory;
decoding a Secure Hash Algorithm (SHA) 256 schedule instruction, the SHA 256 schedule instruction having a first field specifying a first 128-bit SIMD source register, the first 128-bit SIMD source register storing a first operand that includes a first 32-bit data element in bits [31:0], a second 32-bit data element in bits [63:32], a third 32-bit data element in bits [95:64], and a fourth 32-bit data element in bits [127:96], the SHA 256 schedule instruction having a second field specifying a second 128-bit SIMD source register, the second 128- bit SIMD source register storing a second operand that includes a fifth 32-bit data element in bits [31:0], a sixth 32-bit data element in bits [63:32], a seventh 32-bit data element in bits [95:64], and an eighth 32-bit data element in bits [127:96]; and executing the SHA 256 schedule instruction to produce a result that includes:

a first 32-bit result data element in bits [31:0] that equals a sum of a) the first 32-bit data element of the first operand and b) a value equal to the second 32-bit data element rotated right by seven bits, and exclusive-ORed with the second 32-bit data element rotated right by eighteen bits, and exclusive-ORed with the second 32-bit data element shifted right by three bits;

a second 32-bit result data element in bits [63:32] that equals a sum of a) the second 32-bit data element of the first operand and b) a value equal to the third 32-bit data element rotated right by seven bits, and exclusive-ORed with the third 32-bit data element rotated right by eighteen bits, and exclusive-ORed with the third 32-bit data element shifted right by three bits;

a third 32-bit result data element in bits [95:64] that equals a sum of a) the third 32-bit data element of the first operand and b) a value equal to the fourth 32-bit data element rotated right by seven bits, and exclusive-ORed with the fourth 32-bit data element rotated right by eighteen bits, and exclusive-ORed with the fourth 32-bit data element shifted right by three bits; and a fourth 32-bit result data element in bits [127:96] that equals a sum of a) the fourth 32-bit data element of the first operand and b) a value equal to the fifth 32-bit data element rotated right by seven bits, and exclusive-ORed with the fifth 32-bit data element rotated right by eighteen bits, and exclusive-ORed with the fifth 32-bit data element shifted right by three bits.

30. The method of claim 29, further comprising:
decoding a second SHA 256 schedule instruction; and
executing the second SHA 256 schedule instruction to perform another part of SHA 256 scheduling.

31. The method of claim 29, further comprising using one of the first and second 128-bit SIMD source registers as a destination to store the result.

32. The method of claim 29, further comprising performing register renaming.

33. The method of claim 29, further comprising exchanging data with a network processor.

34. The method of claim 29, further comprising exchanging data with a communication device.

* * * * *